(12) United States Patent
Maass et al.

(10) Patent No.: US 6,322,131 B1
(45) Date of Patent: Nov. 27, 2001

(54) CONVERTIBLE VEHICLE WITH A REAR WINDOW WHICH CAN BE LOWERED

(75) Inventors: Joachim Maass, Bissendorf; Frank Lehnig, Osnabrueck, both of (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/531,201

(22) Filed: Mar. 20, 2000

(30) Foreign Application Priority Data

Mar. 19, 1999 (DE) .............................. 199 12 355

(51) Int. Cl.[7] ...................................................... B60J 7/00
(52) U.S. Cl. ................ 296/107.07; 296/146.14; 296/201
(58) Field of Search ................. 296/107.07, 146.14, 296/201, 146.16, 146.15

(56) References Cited

U.S. PATENT DOCUMENTS

| | | | |
|---|---|---|---|
| 4,626,020 | * 12/1986 | Kaltz et al. | 296/107.07 X |
| 4,784,428 | * 11/1988 | Moy et al. | 296/107.07 |
| 5,195,798 | * 3/1993 | Klein et al. | 296/107.07 X |
| 6,123,381 | * 9/2000 | Schenk | 296/107.07 |

* cited by examiner

Primary Examiner—Joseph D. Pape
(74) Attorney, Agent, or Firm—Jordan and Hamburg LLP

(57) ABSTRACT

The invention relates to a convertible vehicle with a roof, which can be folded up and is provided with a rear window, it being possible, in the closed position of the roof, to lower the rear window at least regionally from a normal position into a lowered position below a window parapet line forming the upper boundary of the car body. In order to simplify the installation of a movable rear window for such an embodiment, provisions are made so that the rear window, in the lowered position as well as in the normal position, is held in a frame, which is firmly connected with the roof, as a result of which special adjustment of the rear window or of a different component with respect to the roof is superfluous.

26 Claims, 24 Drawing Sheets

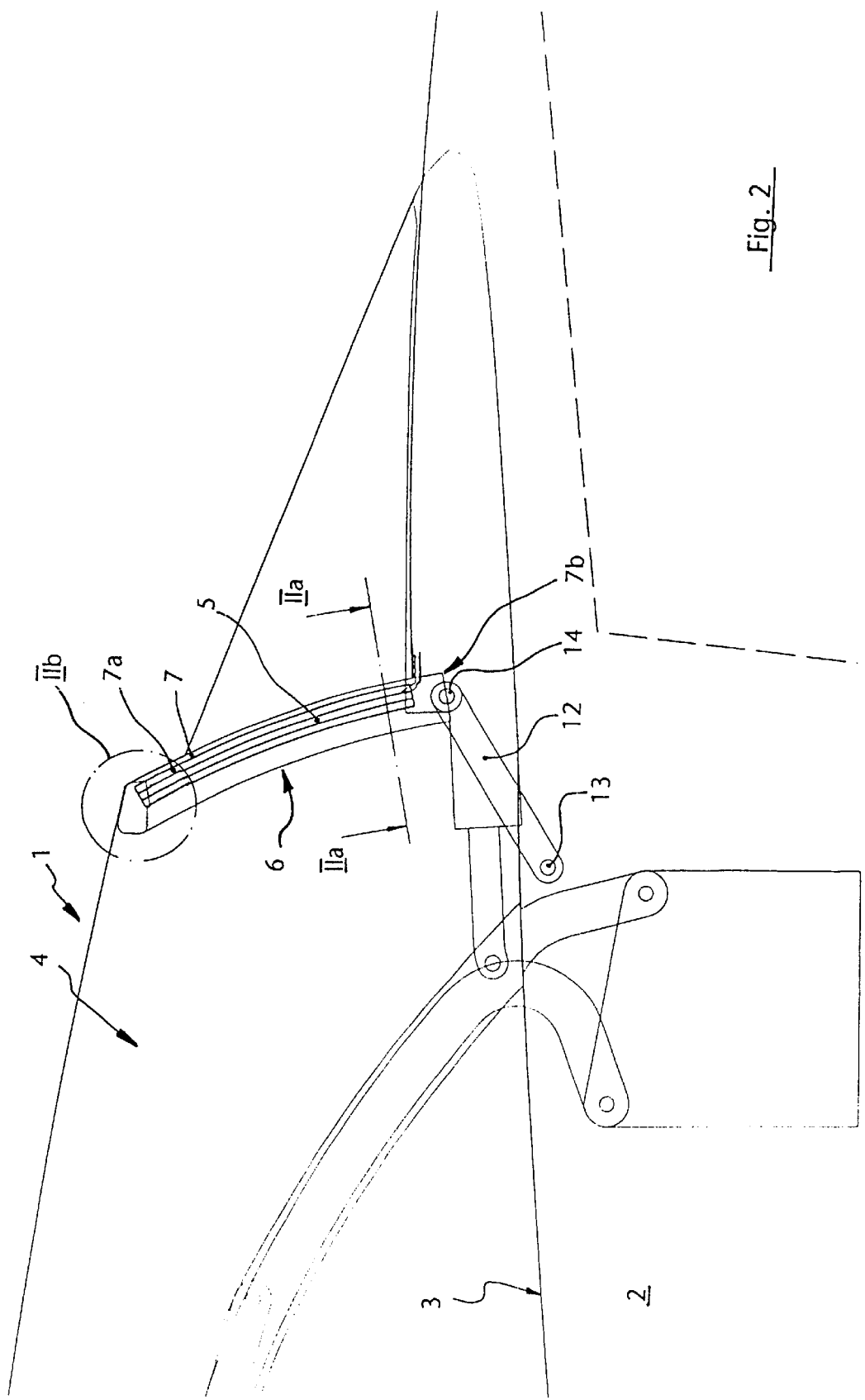

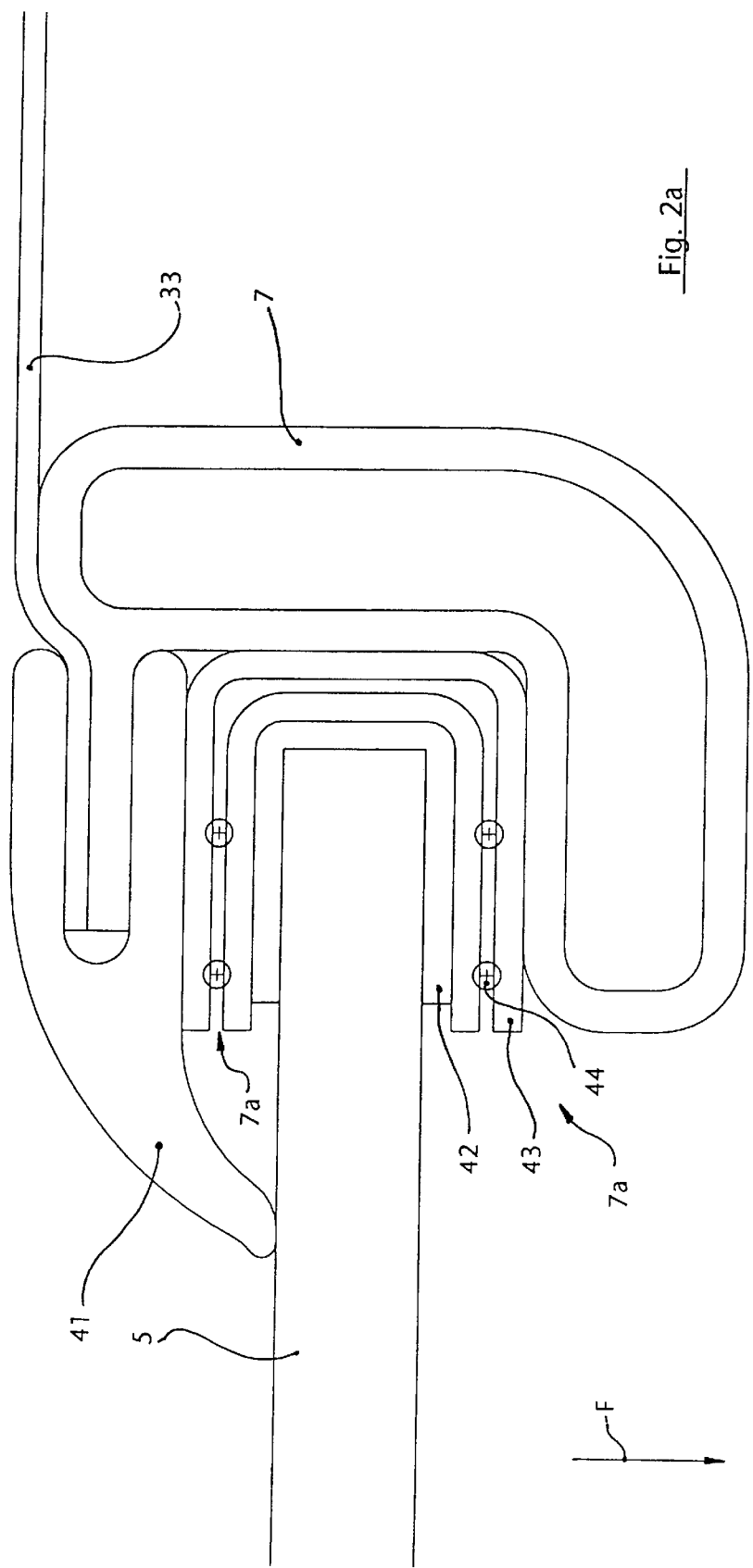

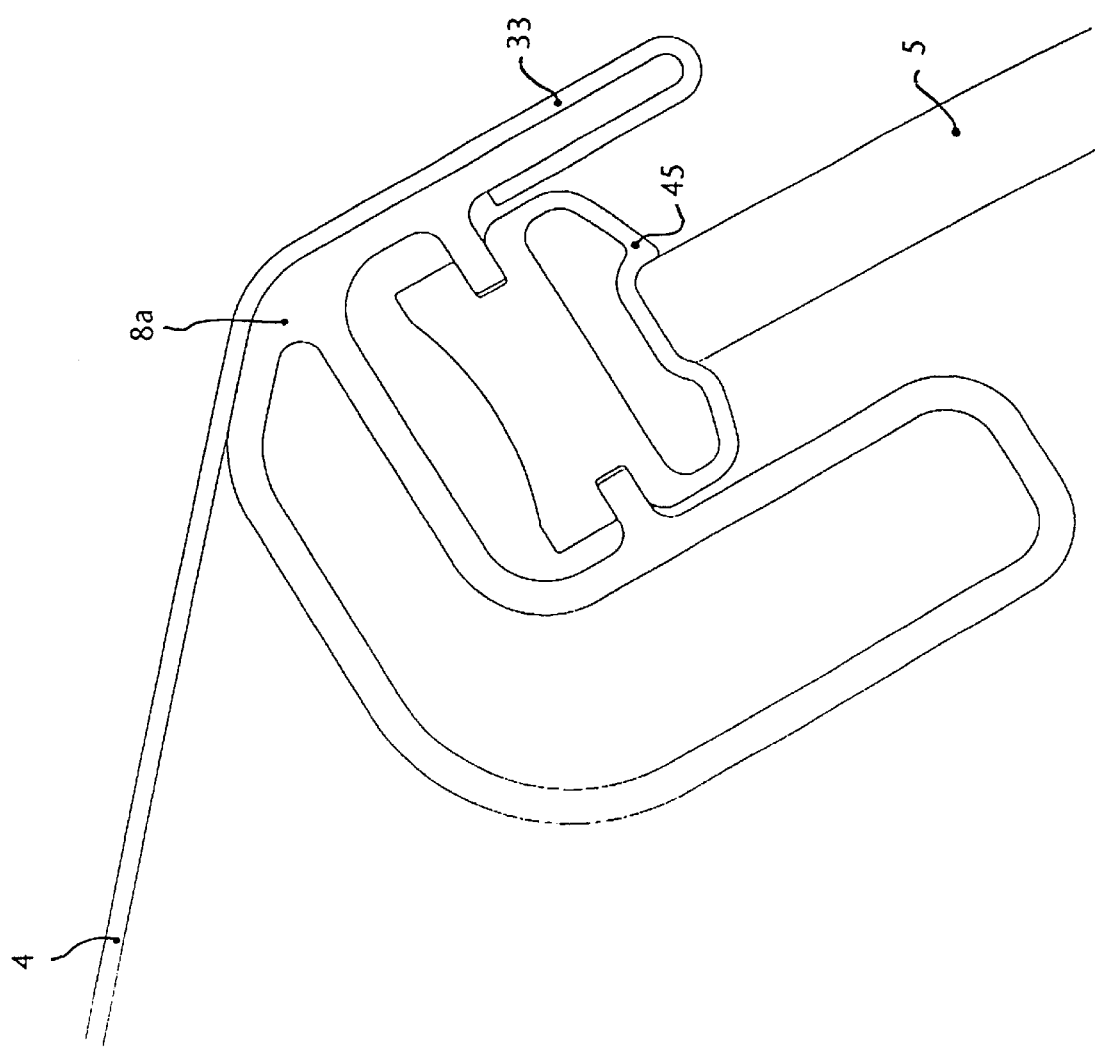

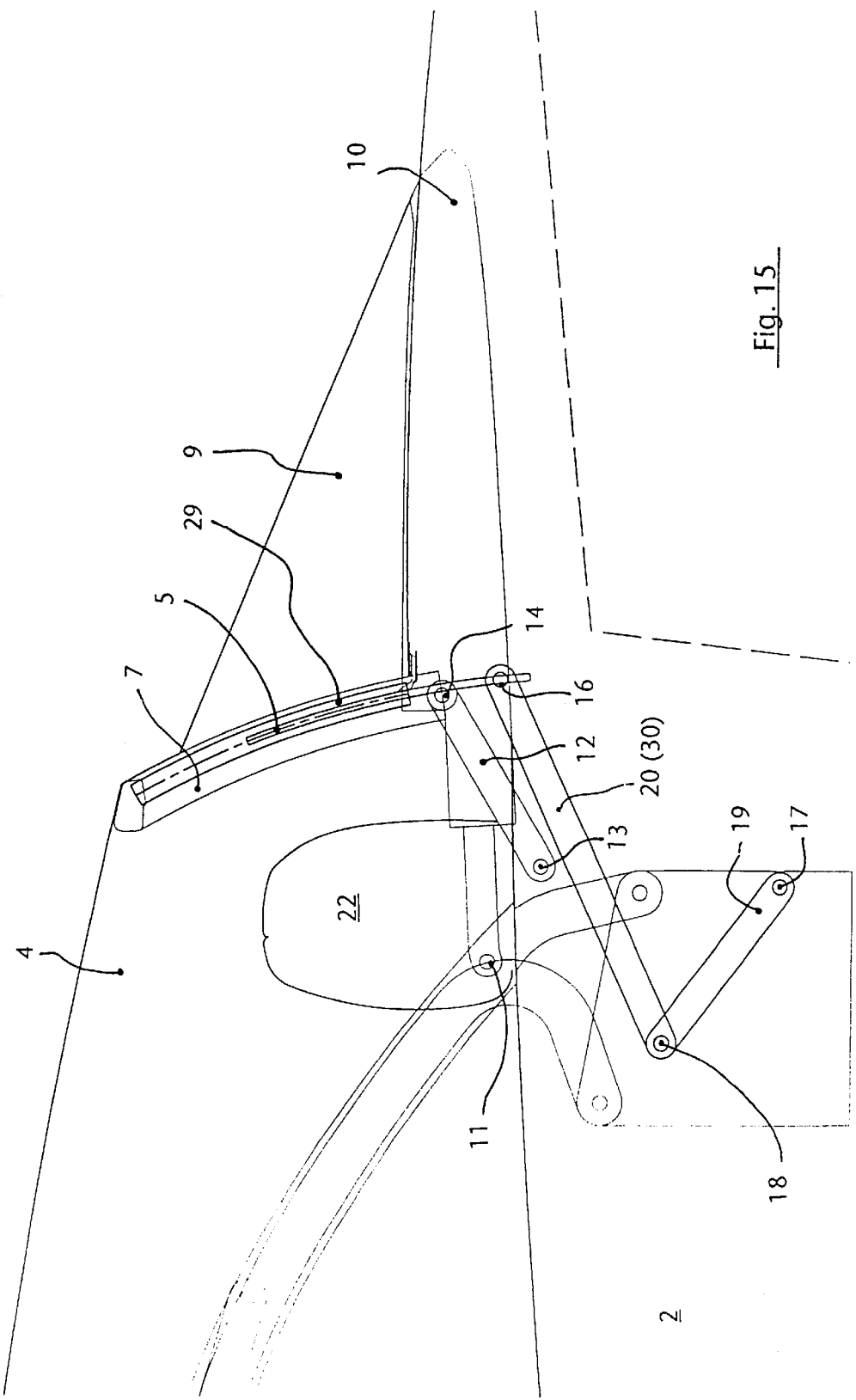

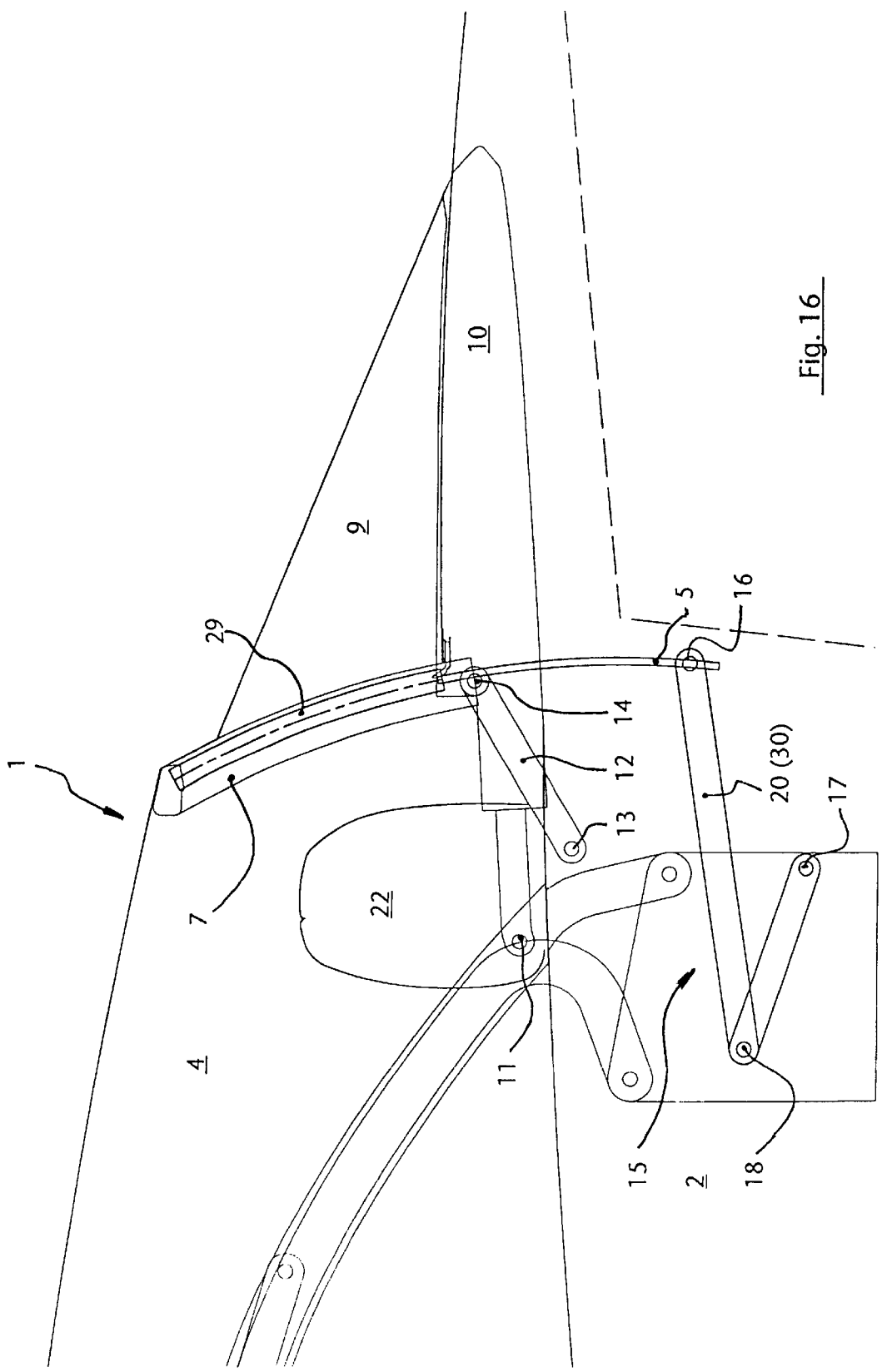

CONVERTIBLE VEHICLE WITH A REAR WINDOW WHICH CAN BE LOWERED

BACKGROUND OF THE INVENTION

The invention relates to a convertible vehicle with a rear window, which can be lowered below a window parapet line forming the upper boundary of the car body.

DE 43 20 603 C2 shows a convertible vehicle, for which a rear window is held in a shaft, which is fitted transversely in a vehicle car body and held separately from the roof construction and can be shifted from an inoperative open position of the rear window in this shaft upwards into a closed position for sealing the folding top at the rear. For assembling such a convertible vehicle, it is necessary to align the roof construction with respect to the car body and to adjust the shaft module, comprising the window in the inoperative position, with respect to the car body and with respect to the roof construction. This increases the adjusting work during the assembly appreciably. In addition, the module, accommodating the window, is a heavy and bulky component which, because of its extent in the installed state, shortens the trunk space.

From DE 36 07 650 A1, a convertible vehicle is known, the rear window of which can be shifted by two pairs of levers, together with its frame, from a position, closing the rear window opening, into a stowage position, which is remote from the roof. Such a lever mechanism is exceedingly expensive and requires much space in the vehicle. Moreover, in the closed position, the frame, holding the rear window, is pressed only against the outlet opening, so that sealing problems arise there.

SUMMARY OF THE INVENTION

It is an object of the invention to improve a convertible vehicle of the type named above with regard to its installation properties.

By the inventive holding of the rear window in a frame, firmly connected with the roof, an adjustment of a further component with respect to the folding top is avoided. In the normal position as well as in the lowered position, the rear window remains connected with the folding top. With that, it is aligned adequately merely by adjusting the roof and is installed in the vehicle together with the roof in the same way as a fixed rear window.

It is particularly advantageous that the window, in the lowered position, is suspended below the leading edge freely in the car body, so that further bulky and heavy components are unnecessary.

In a particularly advantageous development, the rear window can be swiveled up with respect to the frame, which is open downward. Consequently, during the opening or closing of the roof, the frame, with the rear window swiveled up, can be guided over obstacles such as any headrests or roll bars, which would collide with the rear window, if the latter were in the closed position. As a result, particularly in the case of four-seater convertibles, very advantageous, kinematic swiveling up conditions can be created for the roof, which results in more headspace for the persons seated in the back and, at the same time, advantageous optics. Moreover, if the rear window is in an approximately vertical position, the visibility towards the rear is very good.

Further advantages and distinguishing features arise out of the examples of the object of the invention shown in the accompanying drawings and the following description.

BRIEF DESCRIPTION OF THE DRAWINGS

FIG. 2 shows a diagrammatic side view of the rear region of the folding top with the rear window in a normal position, FIG. 2a shows a section along the line IIa—IIa of FIG. 2, FIG. 10b shows a view of a detail of the upper transverse spar of the frame, approximately the region Xb in FIG. 10, cut in the longitudinal median plane of the vehicle, FIG. 15 shows a view, similar to that of FIG. 11, with a partially lowered rear window, and FIG. 16 shows a view, similar to that of FIG. 15, with a completely lowered rear window.

DESCRIPTION OF THE PREFERRED EMBODIMENTS

Figure 1:
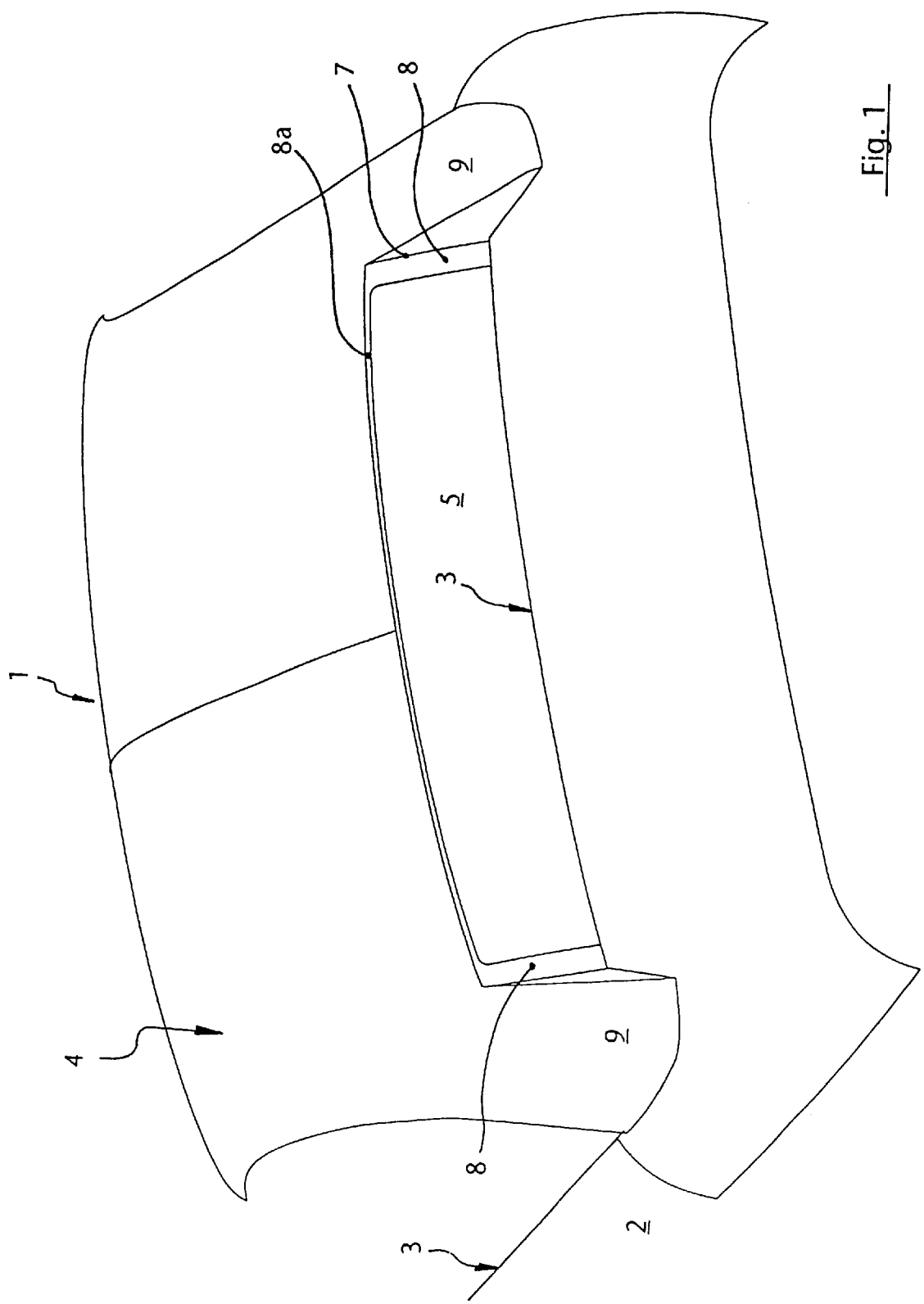
FIG. 1 shows a perspective diagrammatic partial view of the rear of an inventive convertible vehicle.
Figure 2B:
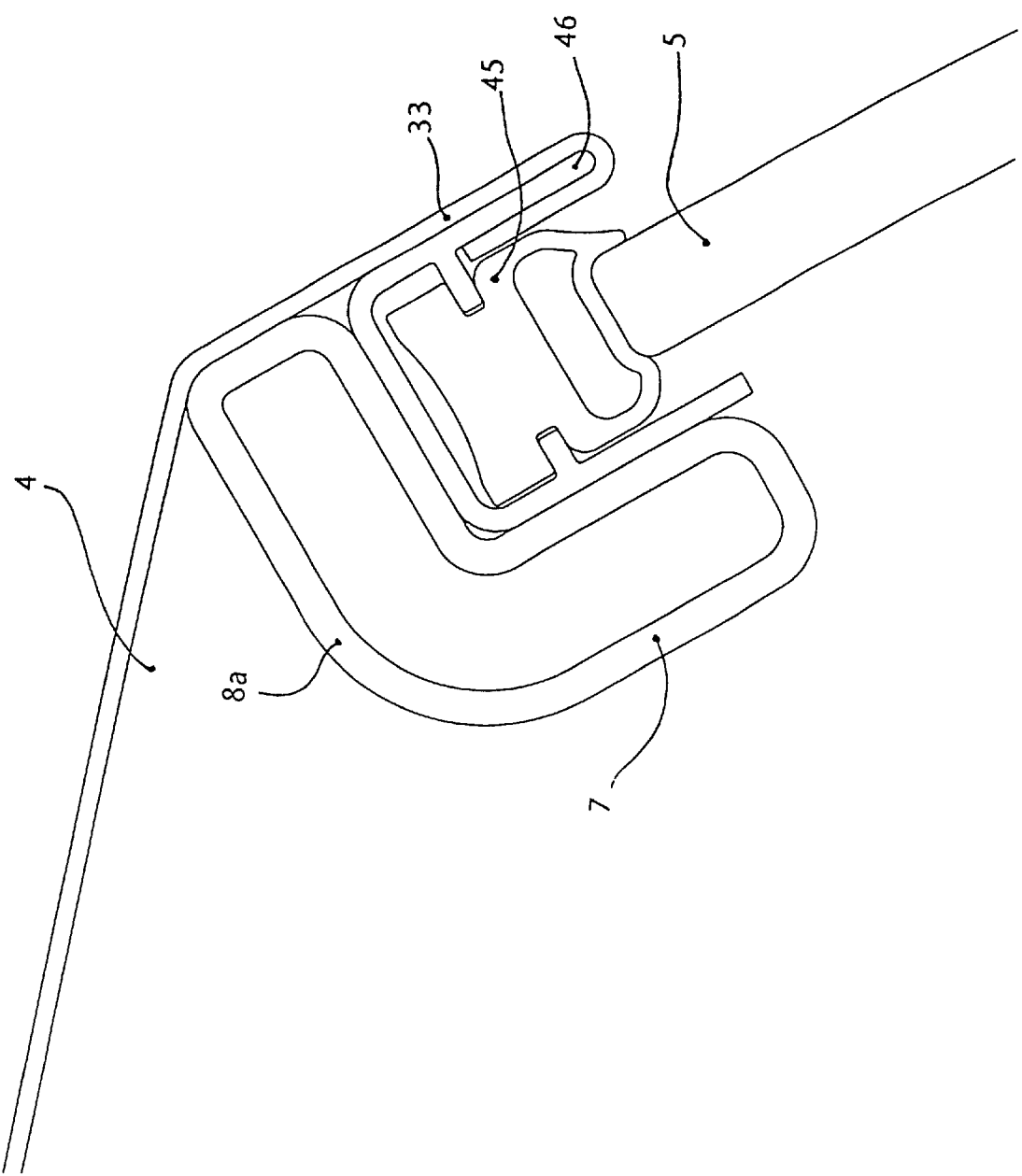
FIG. 2b shows a view of a detail of approximately the region 2b in FIG. 2, cut in the longitudinal median plane of the vehicle.
Figure 3:
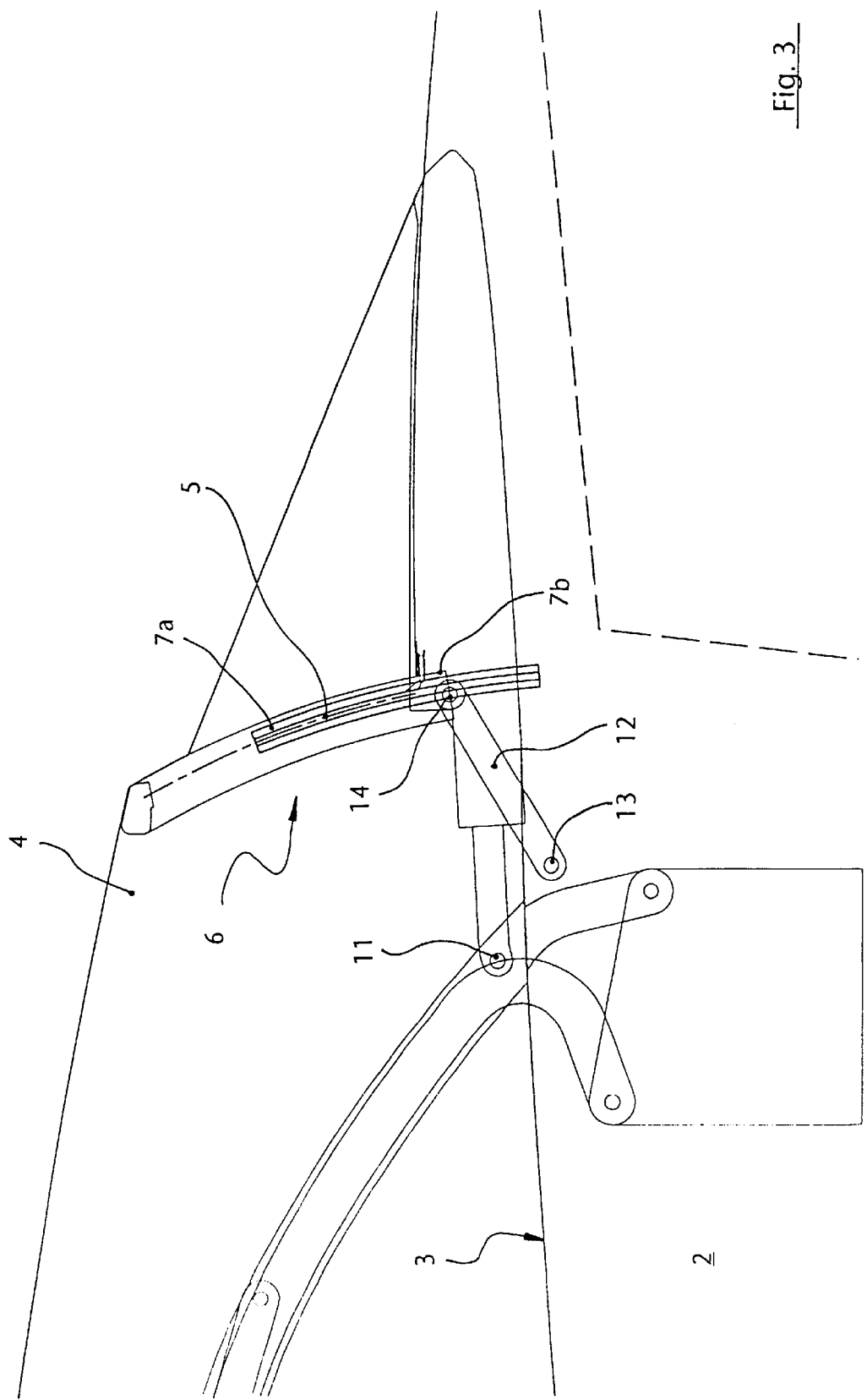
FIG. 3 shows a view, similar to that of FIG. 2, with a partially lowered rear window.
Figure 4:
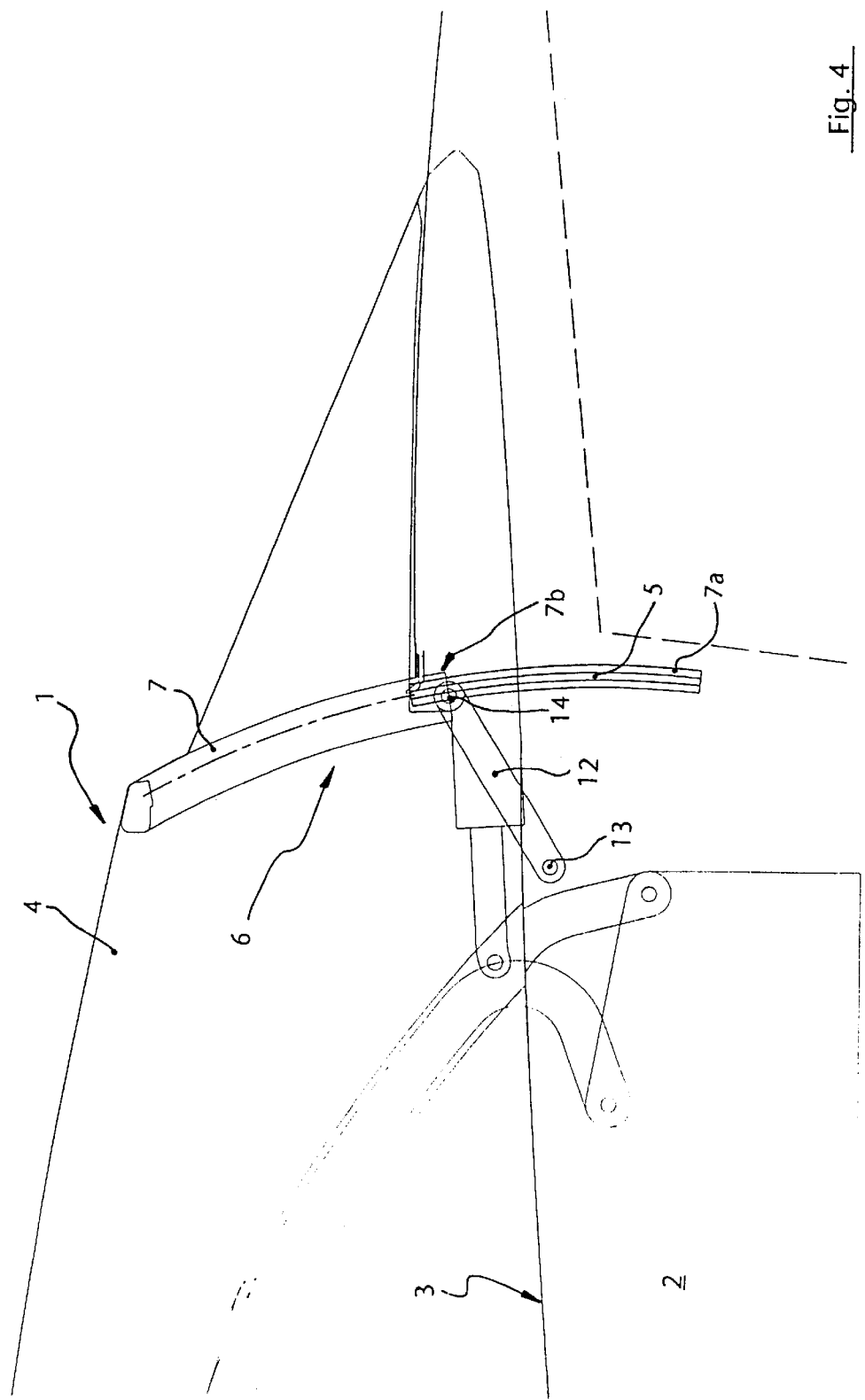
FIG. 4 shows a view, similar to that of FIG. 3, with a completely lowered rear window.

An example of the inventive convertible vehicle 1 has a car body 2, which is bounded at the top by a window parapet line 3 and, above this window parapet line 3, comprises a folding roof 4. The roof 4 is provided with a rear window 5 which, in the closed position of the roof 4, can be shifted from a normal position, in which it closes off this roof 4 tightly towards the rear, into a lowered position. In the lowered position, the rear window 5 is essentially below the window parapet line 3, so that the section 6 of the roof 4, taken up by the rear window, is essentially completely open. The rear window 5 is held in a frame 7 in the normal position (FIG. 2) as well as in the lowered position (FIG. 4). The frame 7 is U-shaped and comprises two short side legs 8, as well as a middle transverse leg 8a. The frame 7 is open in the direction of the window parapet 3. The frame 7 is firmly connected with the roof 4, for example, by gluing and/or welding. The roof 4 may be constructed, for example, as a textile folding roof. It comprises, for example, extruded metal profiles, but can also be constructed in one piece. The rear window 5, guided in the frame 7, may consist of plastic or glass. Because of the firm guidance in the frame 7, a rigid rear window 5, optionally with heating wires and/or antennas, can be used. The guiding parts 7a; 29 for shifting the rear window 5 between the normal position (FIG. 2) and the lowered position (FIG. 4) are disposed in the frame 7.

For this purpose, the frame 7, in the side legs 8, can comprise guiding parts 7a, which are U-shaped in cross section and constructed telescopically in the form of a drawer guiding arrangement. The guiding parts 7a comprise a U-shaped frame section 42, which is firmly connected with the side regions of the rear window 5, bordering them, and can be moved up and down over sliding elements 44 relative to an outer frame section 43 (FIG. 2a). The frame section 42 is lowered with the rear window 5 and remains with its upper region in the outer guide, being held by the frame parts 43. The rear window 5 can therefore be held hanging freely in the car body, even in the lowered position. The frame 7 is held at lateral levers 12, which are connected at the one end with the car body 2, so that they can be swiveled about a horizontal axis 13 and, at the other, guide the lower frame region 7b of the frame 7 over a further swiveling axis 14 and can be moved during the roof opening process, as is described in the second example.

In the normal position, a stop seal 45, against which the rear window 5 is pressed (FIG. 2b), is provided in the region of the transverse leg 8a as the upper stop for the rear window 5. Moreover, it can be seen in FIGS. 2a and 2b that the material 33 of the folding top of the textile-covered roof 4 in the example is pressed into a seal 41 or fixed at a bracket 46 of the transverse leg 8a.

Figure 5:
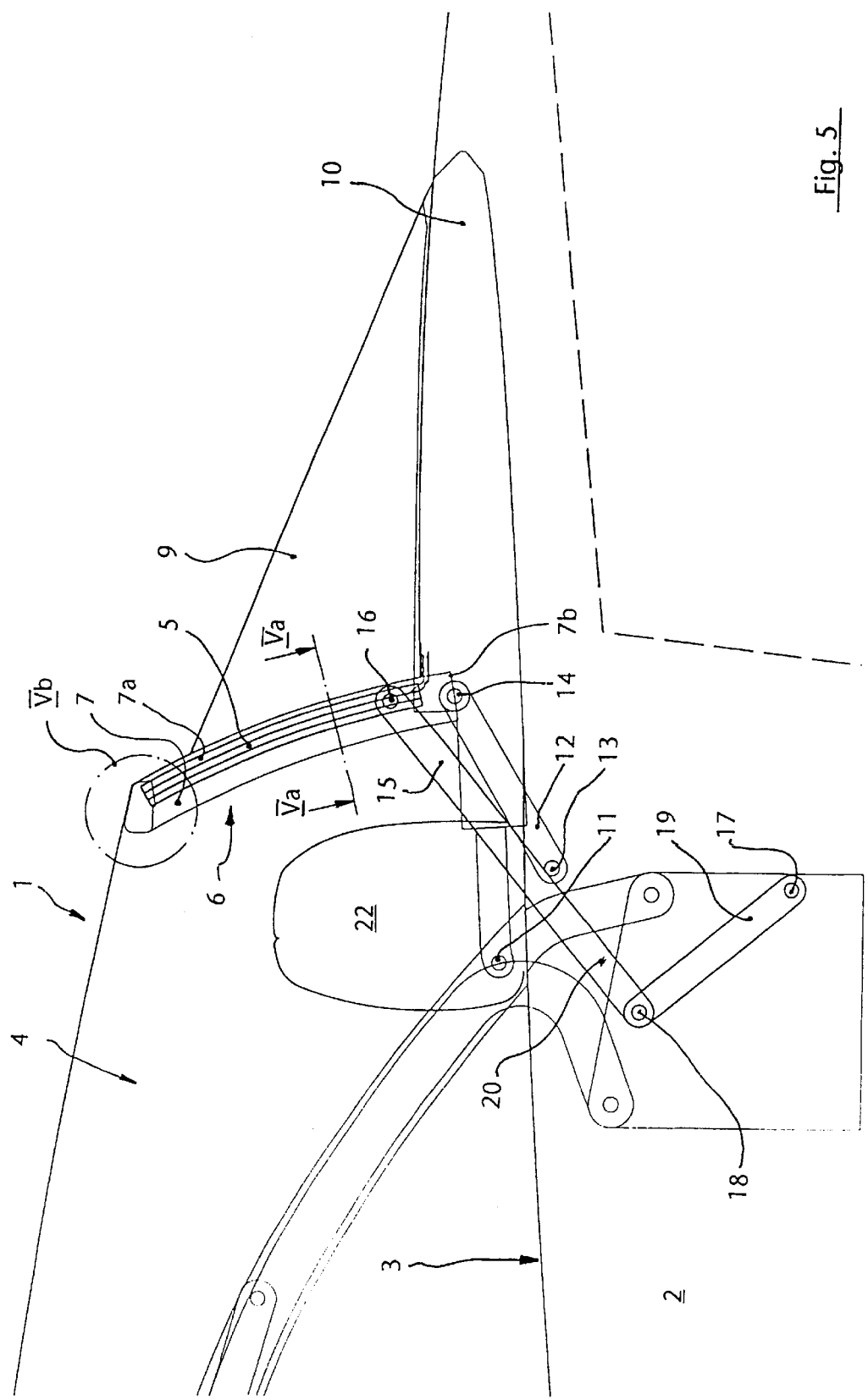
FIG. 5 shows a view, similar to that of FIG. 2, of an alternative embodiment, which additionally comprises a swiveling lever control for making it possible to swivel up the rear window.
Figure 6:
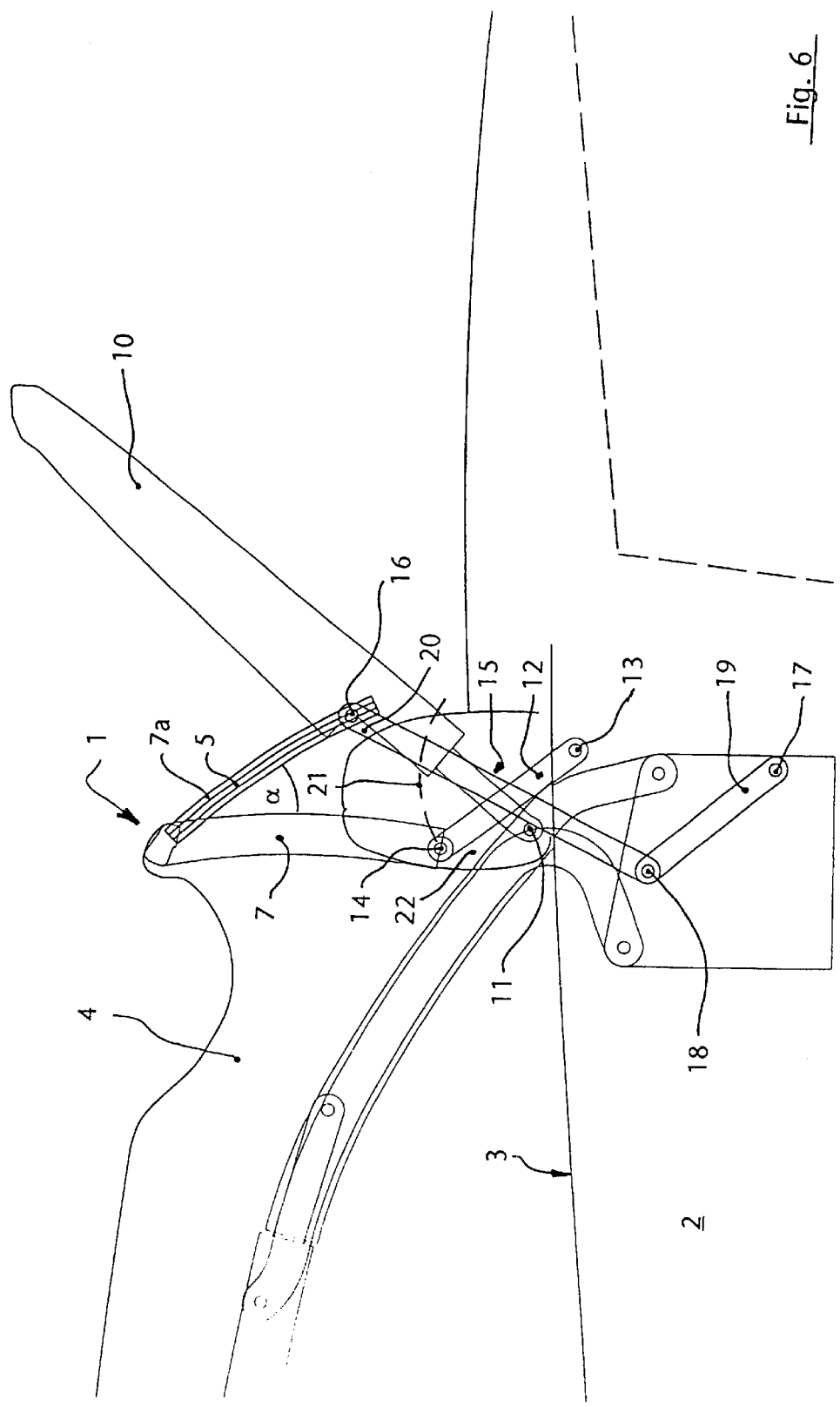
FIG. 6 shows the construction of FIG. 5 during the opening of the roof.
Figure 7:
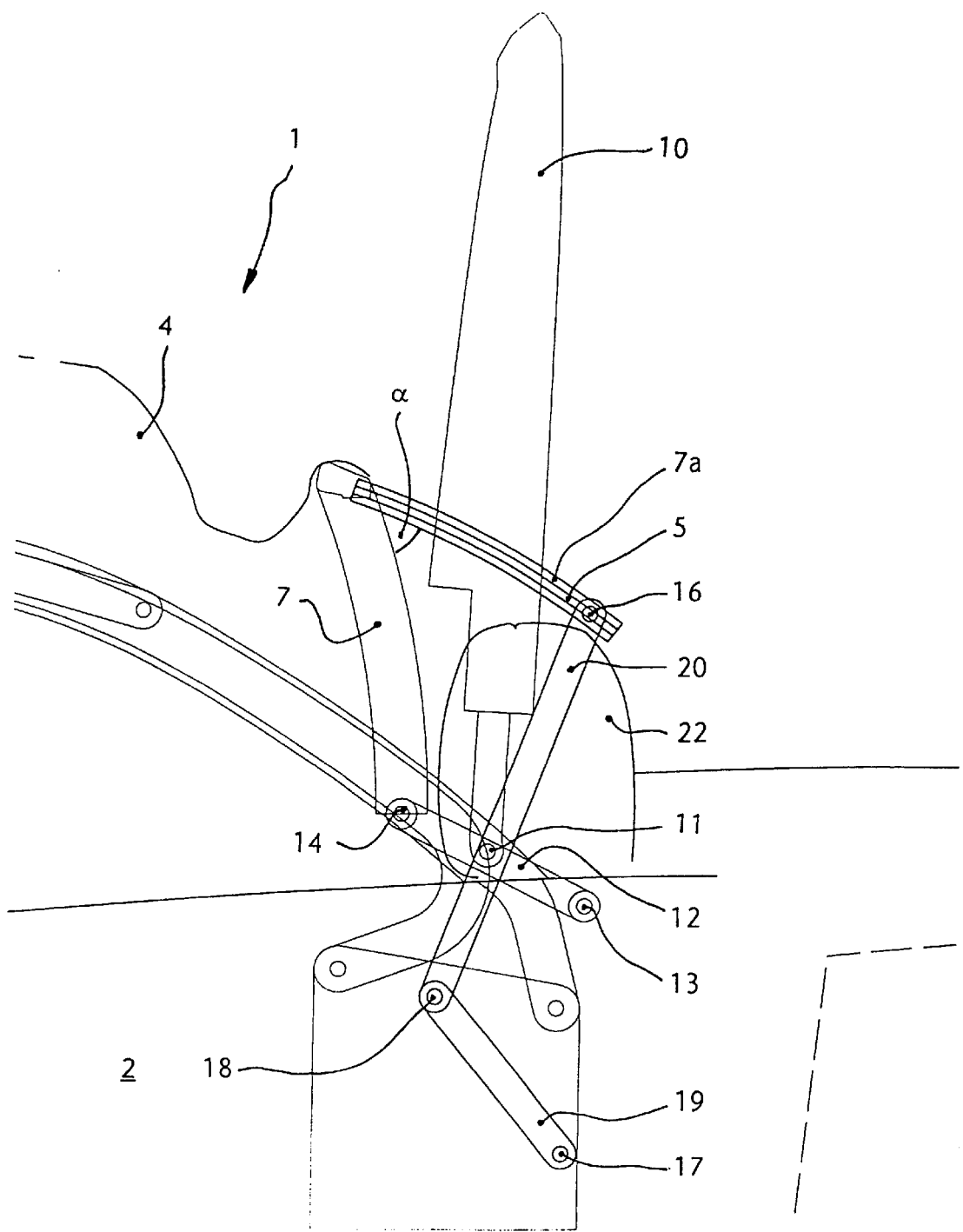
FIG. 7 shows a view, similar to that of FIG. 6, as the opening of the roof has progressed further.

Pursuant to a further embodiment of the invention, which is used particularly in convertible vehicles equipped with a rear bench, the rear window 5 is held pivotably in the frame 7. The rear window 5 can then be swiveled up with its lower end in order to overcome, in the swiveled-up position, obstacles, such as headrests or roll bars (FIGS. 5 to 7). Such a mobility of the rear window 5 opens up the possibility of equipping the folding top with an almost vertical rear window 5 closely behind the headrests of the rear seats. This has a positive effect on the visibility towards the rear through the cut-out 6. A roof 4 can be realized, which runs out into two lateral end regions 9, which protrude towards the rear and are essentially triangular in plan view. Nevertheless, the already mentioned, almost vertical rear window 5 is disposed in front of and between this end region 9. Moreover, due to this type of roof 4, more headspace for the rear passenger is ensured. An inclined installed position of the rear window 5 remains possible even with this form of roof. The end regions 9 are pre-stressed over tension brackets 10, so-called fins, with respect to the car body 2, so that, in side view, it has lines similar to those of a conventional convertible folding top with a window disposed obliquely in the end region of the folding top. As in the first example, the frame 7 is held movably over lateral levers 12. In addition, a swiveling lever arrangement 15 engages the U-shaped guiding parts 7a of the frame 7 in the lower region over a swiveling axis 16. At the other end, the swiveling lever arrangement 15 is pivotably fixed in the main bearing 17. The swiveling lever arrangement 15 comprises a joint 18, which connects its two levers 19, 20 pivotably together. The lever 19 extends from the main bearing 17 to the joint 18 and the lever 20 extends from the joint 18 to the working axis 16 at the rear window 5.

In the closed position of the roof 4, shown in FIG. 5, the rear window 5 is held with its lower end in a sealing channel with respect to the car body, so that a swiveling up is not possible in this position. For opening the roof 4 (FIGS. 6 to 8), initially the fins 10 are swiveled upward about the swiveling axis 11, as a result of which the roof 4 loses its tension. During the swiveling up, the frame 7, which stands in the closed position on the car body 2 in the region of the plane of the window parapet 3, is at the same time swiveled upward about the lever 12 and forwards on a circular path 21, and is moved laterally past the headrests 22 and, if necessary, past roll bars additionally disposed. If the rear window 5 would remain standing in the frame 7, a collision with the parts named would result during the movement of the lever 12 about the swiveling axis 13. In order to avoid this, the rear window 5 is swiveled up with respect to the frame 7 by the swiveling lever arrangement 15 during the opening of the folding top. This can be accomplished, for example, by means of hydraulic or electric driving elements, which move the lever 20 upward about the joint 18 in such a manner that an angle α results between the rear window 5 and the frame 7. For moving the frame 7, either a further driving mechanism is required or, particularly advantageously, the frame 7 is carried along necessarily by the swiveling motion of the fins 10 and the therefrom resulting folding kinematics of the roof 4.

Figure 5A:
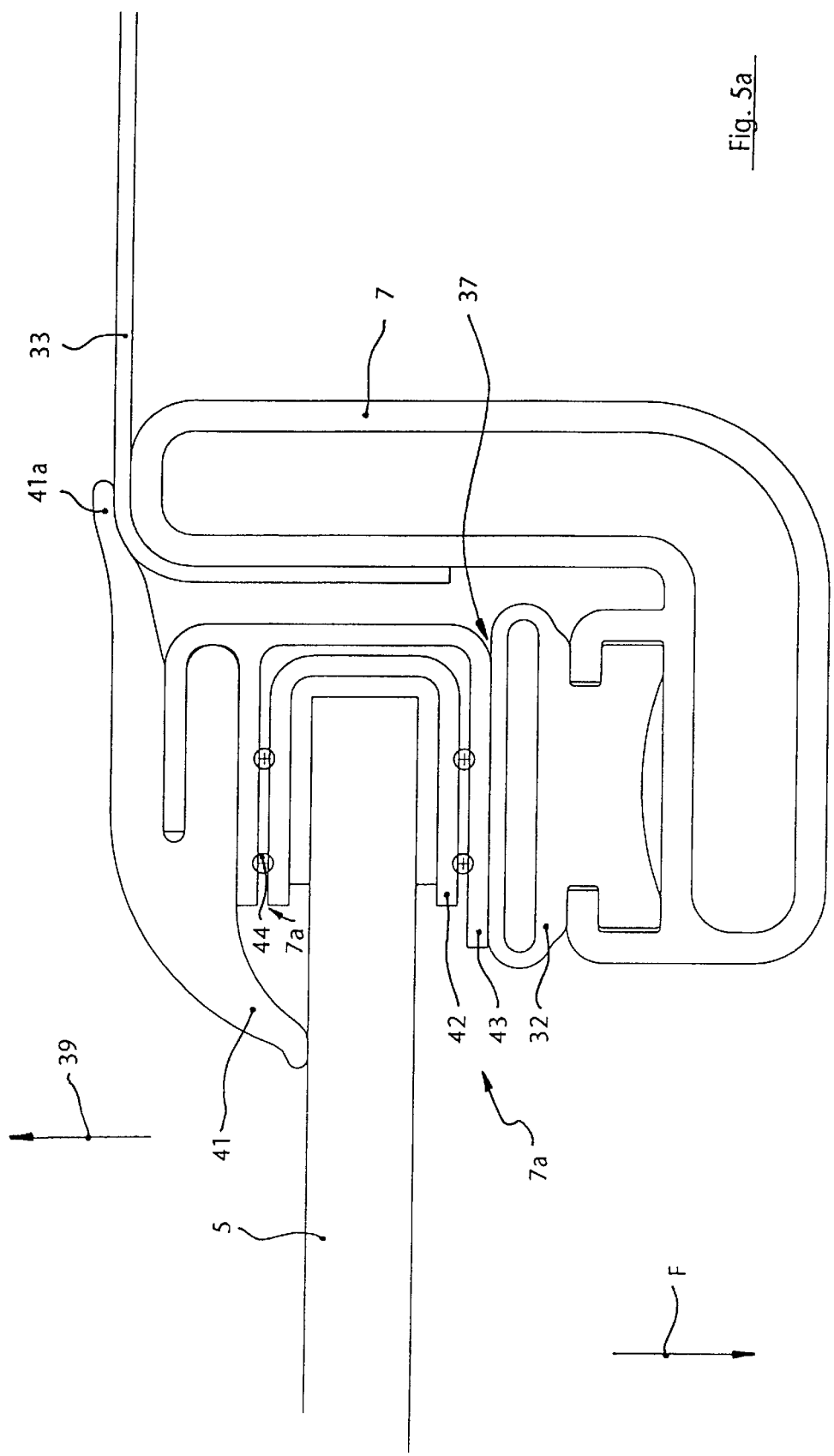
FIG. 5a shows a section along the line Va—Va in FIG. 5.
Figure 5B:
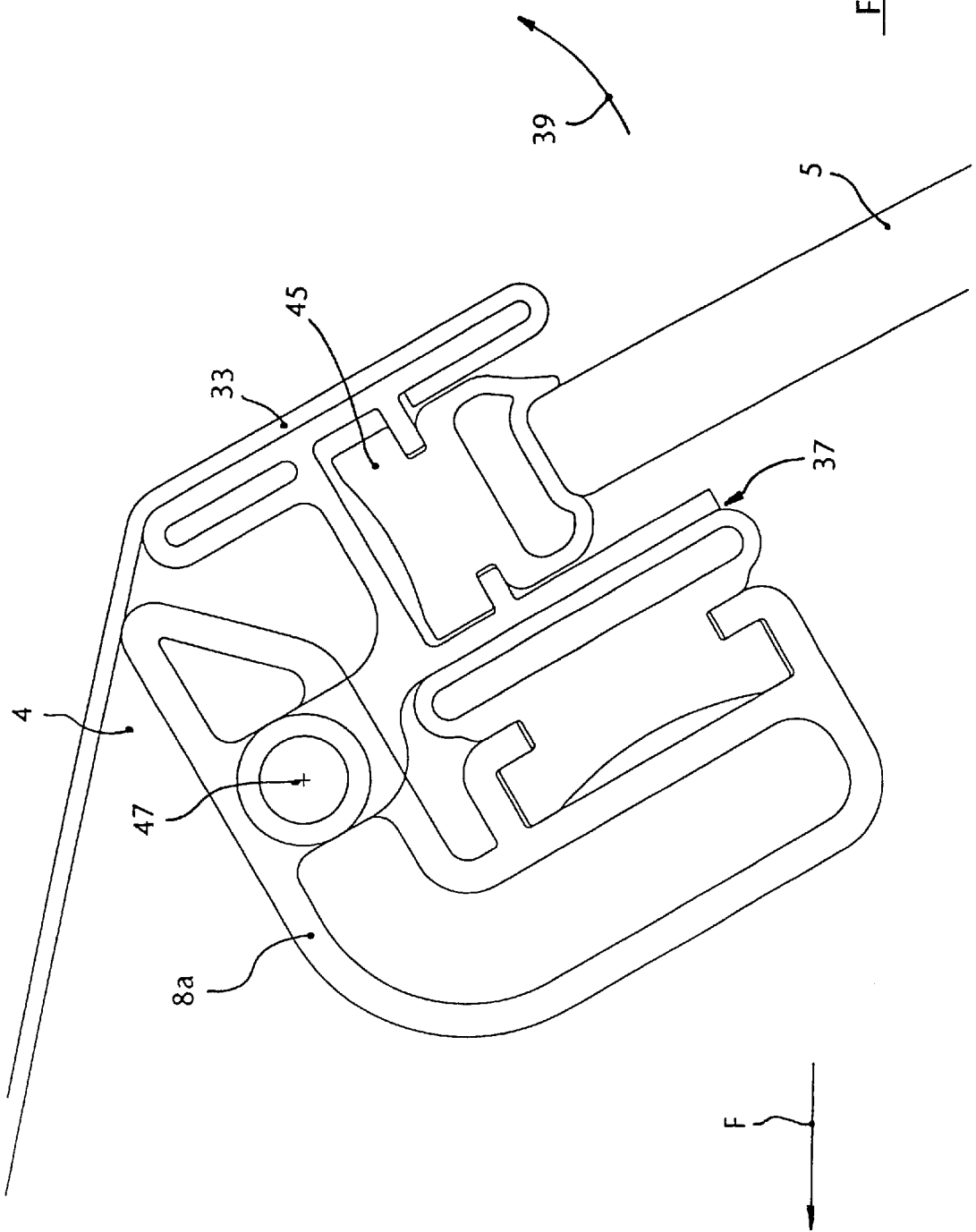
FIG. 5b shows a view of a detail of the region Vb in FIG. 5, cut in the longitudinal median plane of the vehicle.

The swiveling up affects not only the rear window 5, but also the guiding parts 7a, which are U-shaped in cross section and bring about the guidance as the rear window 5 is lowered. Relative to the frame 7, which may be constructed L-shaped in cross section, the rear window 5 is therefore swiveled up as a whole with its lower end in the direction of the arrow 39 counter to the driving direction F. On the other hand, in the region of the transverse leg 8a in the region of the frame 7, the rear window 5 maintains contact with the latter. The guiding parts 7a, enclosing the parts 42, 43 and 44, are separated during the swiveling up in the direction of the arrow 39 at the parting plane 37 from a seal 32 on the frame. The rear window 5 is therefore also bordered by the guiding parts 7a in the swiveled up position. Furthermore, a seal 41 is provided which, with a bracket 41a, is in contact with the material 33 of the folding top in the closed position and thus brings about a seal between the rear window 5 and the material 33 of the folding top. FIG. 5b shows that a deformable seal 45 is provided once again as the upper stop for the rear window. The swiveling axis 47, about which the rear window 5 can be swiveled up, is in the upper transverse frame part 8a and brings about the referred to separation of the parts at the parting plane 37.

During the further opening of the roof 4 (FIG. 7), the fins 10 are brought into a vertical position, the frame 7 is swiveled further towards the front and downwards on the circular path 21, the opening angle α between the rear window 5 and the guiding part 7a bordering it is enlarged opposite the frame 7, so that contact between the rear passengers and the rear window 5 is avoided also in this position. On the other hand, the lateral legs 8 of the frame 7, which can be moved laterally past the headrests 22, lies so far on the outside, that passengers have no contact with them.

Figure 8:
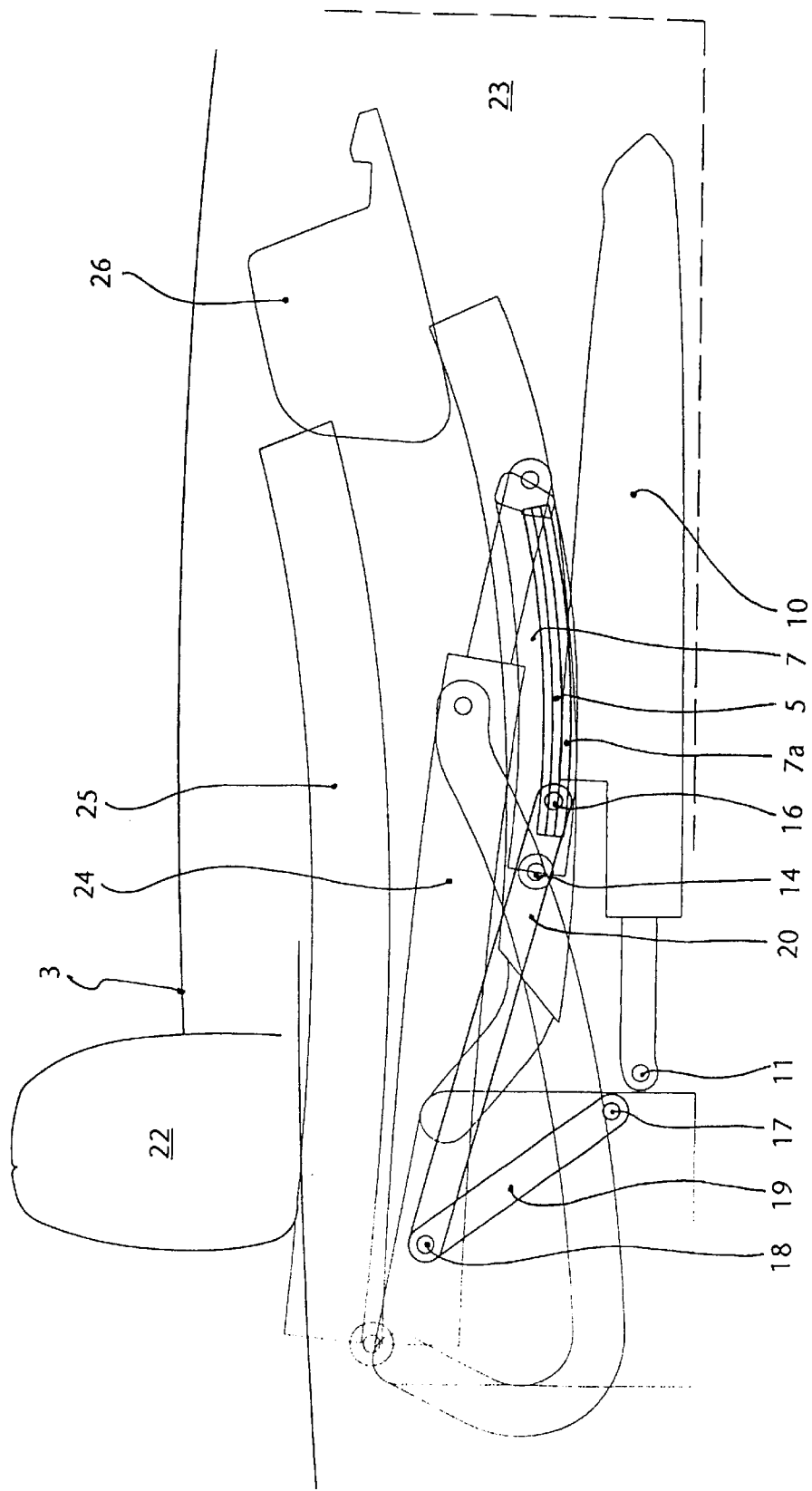
FIG. 8 shows the construction of FIG. 5 with the roof, together with the rear window in the roof, is stowed away completely.

In the position of FIG. 7, the lid of the box for the folding top, which is not shown and hinged at the rear, can be swiveled up, so that subsequently the roof 4 can be stowed in a folding top box 23. This position is shown in FIG. 8. The fins 10 about the swiveling axes 11, which are guided downward during the movement, are inserted here essentially horizontally in the floor region of the box 23 for the folding top. The rear window 5 is swiveled in once again with respect to the frame 7, so that the opening angle α is restored. The rear window 5 therefore assumes a folded-in position, during which it remains a complete component of the folded top 4 and does not require more space than the frame 7. The swiveling back of the rear window 5 with respect to the frame 7 is brought about by the coupled swiveling motions of the lever 12 about the axis 13 and of the levers 19 and 20 about the axis in the main bearing 17 and in the joint 18. The frame 7 then lies essentially parallel above the fins 10. Above this frame 7, there is a middle part 24 of the roof and a front part 25 of the roof, which, in the closed position, is supported with its front transverse end 26 on a windshield frame. As a whole, therefore, the roof 4 is folded in Z-shaped fashion.

Overall, therefore, a folding top arrangement is created, which ensures a separate lowering of the rear window 5 in the closed state of the roof 4. However, when the folding top is stowed, the rear window 5 is an integral part of the folding top 4 and is stowed with the latter in the box 23. In addition, because the rear window 5 can be swiveled up with respect to the frame 7 to avoid collisions, particularly advantageous folding kinematics are brought about and the space relationships for the rear passengers are improved.

Figure 9:
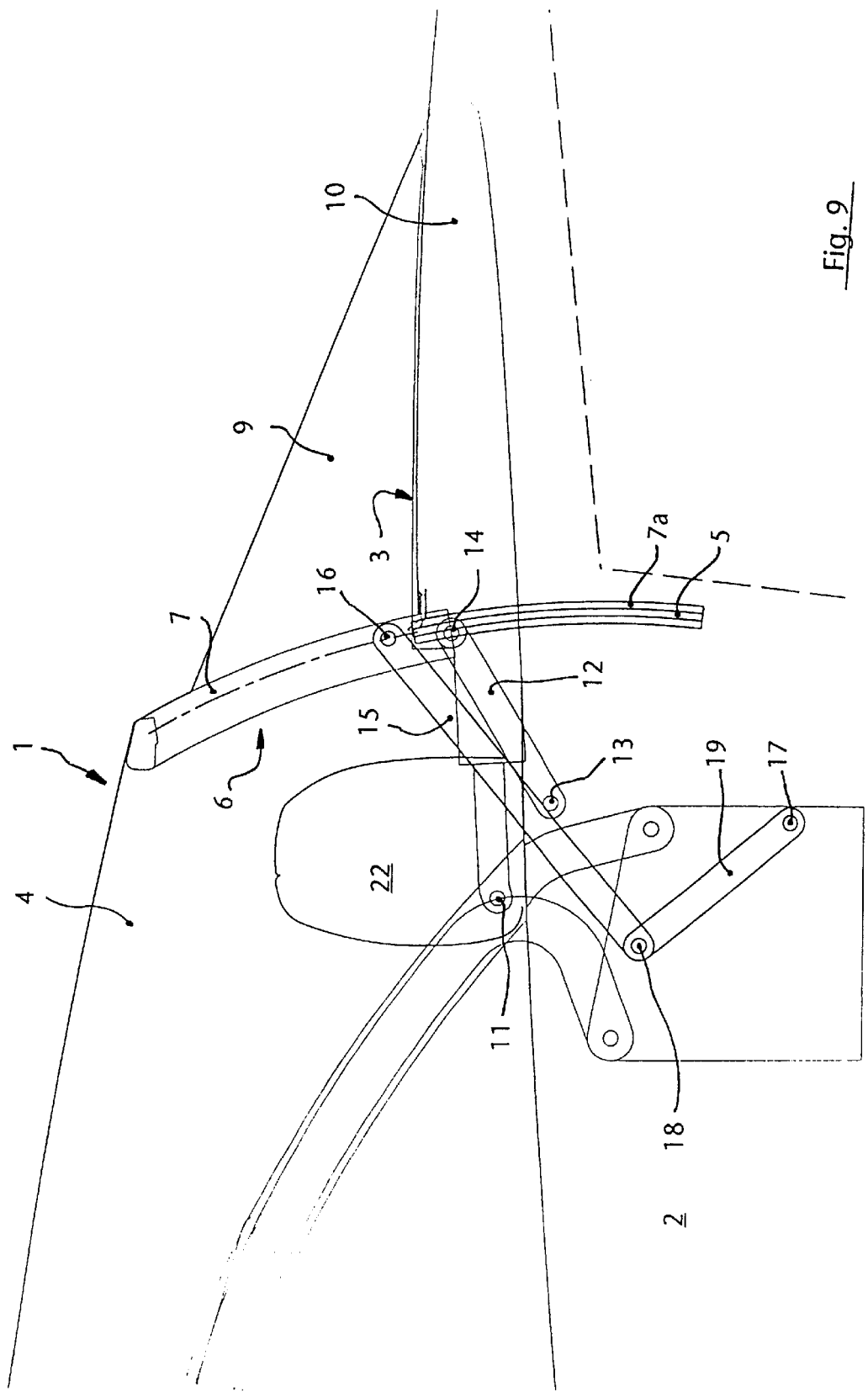
FIG. 9 shows the construction of FIG. 5 with the roof closed and the rear window lowered.

In FIG. 9, the state, corresponding to that of FIG. 4, is shown for the example. In this state, the roof 4 is closed and the rear window 5 is lowered in its guiding parts 7a and hangs freely in the car body.

Figure 10:
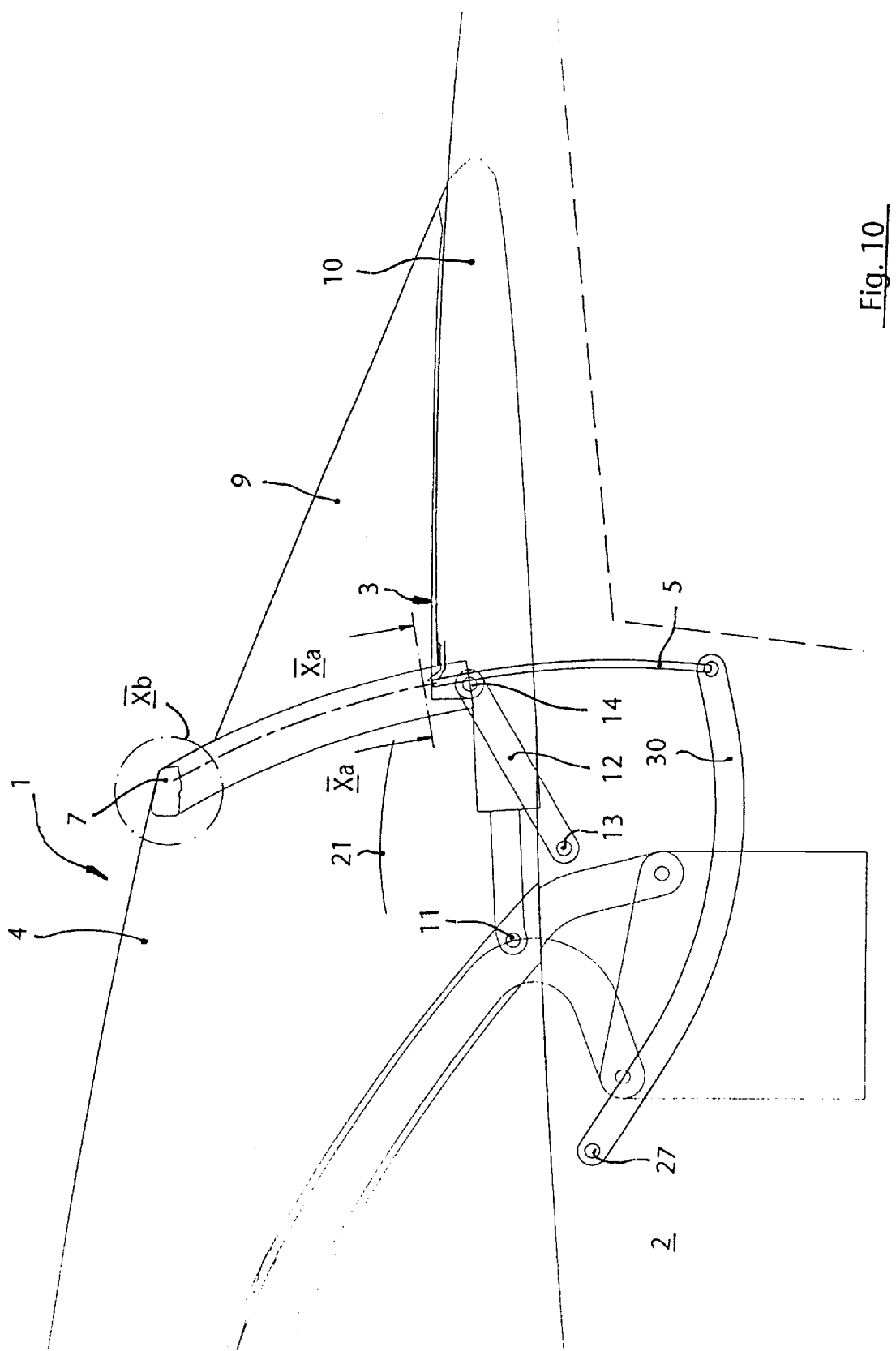
FIG. 10 shows a view, similar to that of FIG. 9, of an alternative embodiment with an additional driving lever.
Figure 10A:
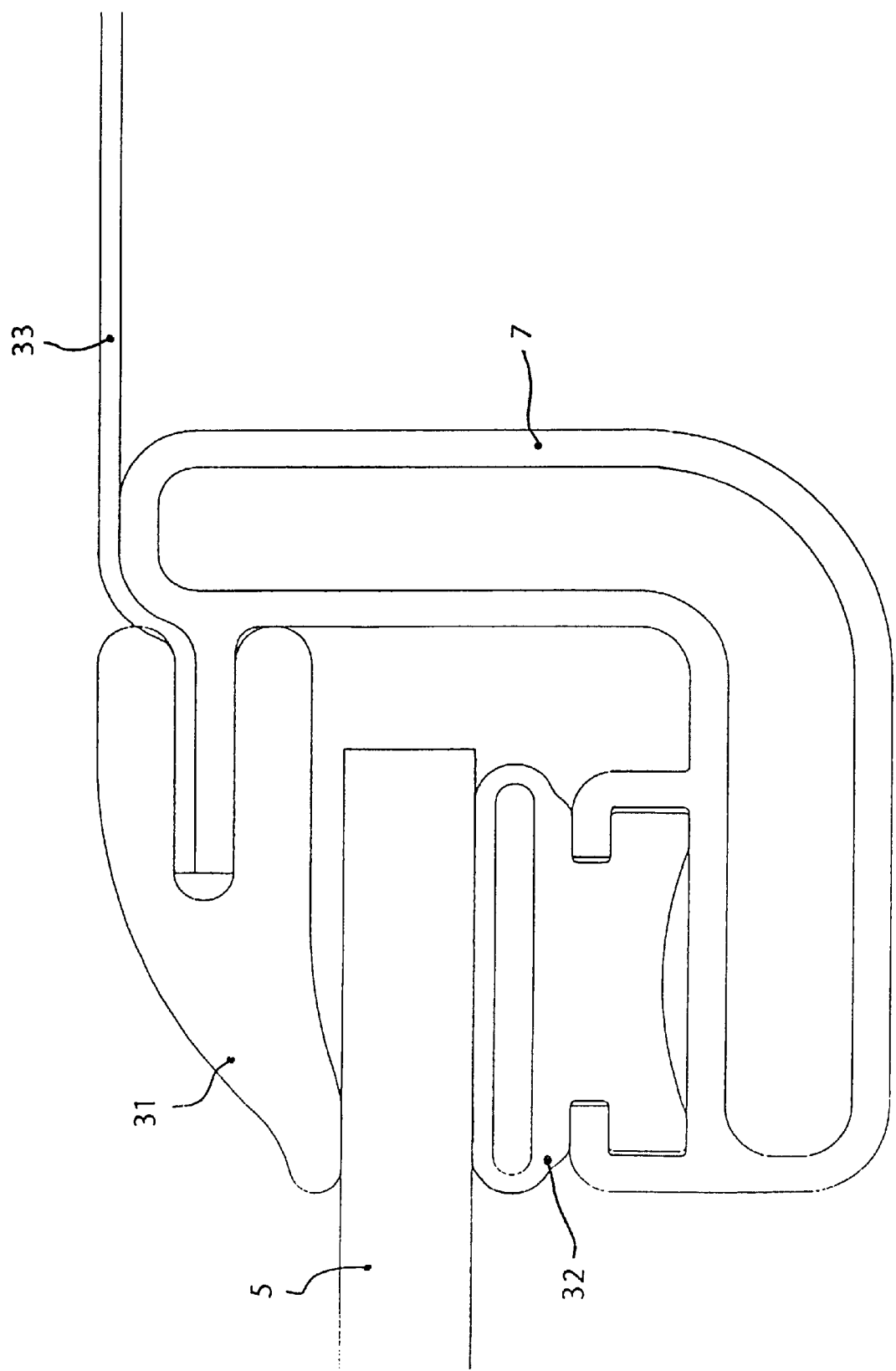
FIG. 10a shows a section along the line Xa—Xa in FIG. 10.

In accordance with a third embodiment (FIG. 10), the rear window 5 can be moved up and down over a driving lever 30 engaging the lower region of the rear window and held at the other end at a pivoting axis 27 in the region of the main bearing 17. In this embodiment, pivotability of the rear window 5 is superfluous in this embodiment, since rear headrests or the like are not installed. Like the first embodiment, this one also comes into consideration for two-seater vehicles. The process of opening the folding top is similar to the last embodiment with the difference that, during the whole of the opening phase, the rear window 5 can remain parallel to the frame 7, since there are no obstacles in the way. The rear window 5 does not have telescopic guide parts 7a here and, instead, is held only over sliding pieces 29 in the frame 7, which can be constructed U-shaped in cross section here, because pivotability is not required. The up and down shifting of the rear window 5 is brought about by an electric or hydraulic driving element, which controls the swiveling of the driving lever 30 about the swiveling axis 27.

Pursuant to a fourth example (FIGS. 11 to 16), the combination of the third example with a swiveling lever arrangement 15 is shown, which is required if obstacles, such as headrests 22, are to be overcome during the process of opening the folding top. As in FIGS. 5 to 8, the opening mechanism of the roof 4 is shown in FIGS. 11 to 14 and works in the same way as in the second example. With respect to FIGS. 11 to 14, reference is therefore made completely to FIGS. 5 to 8.

Figure 11:
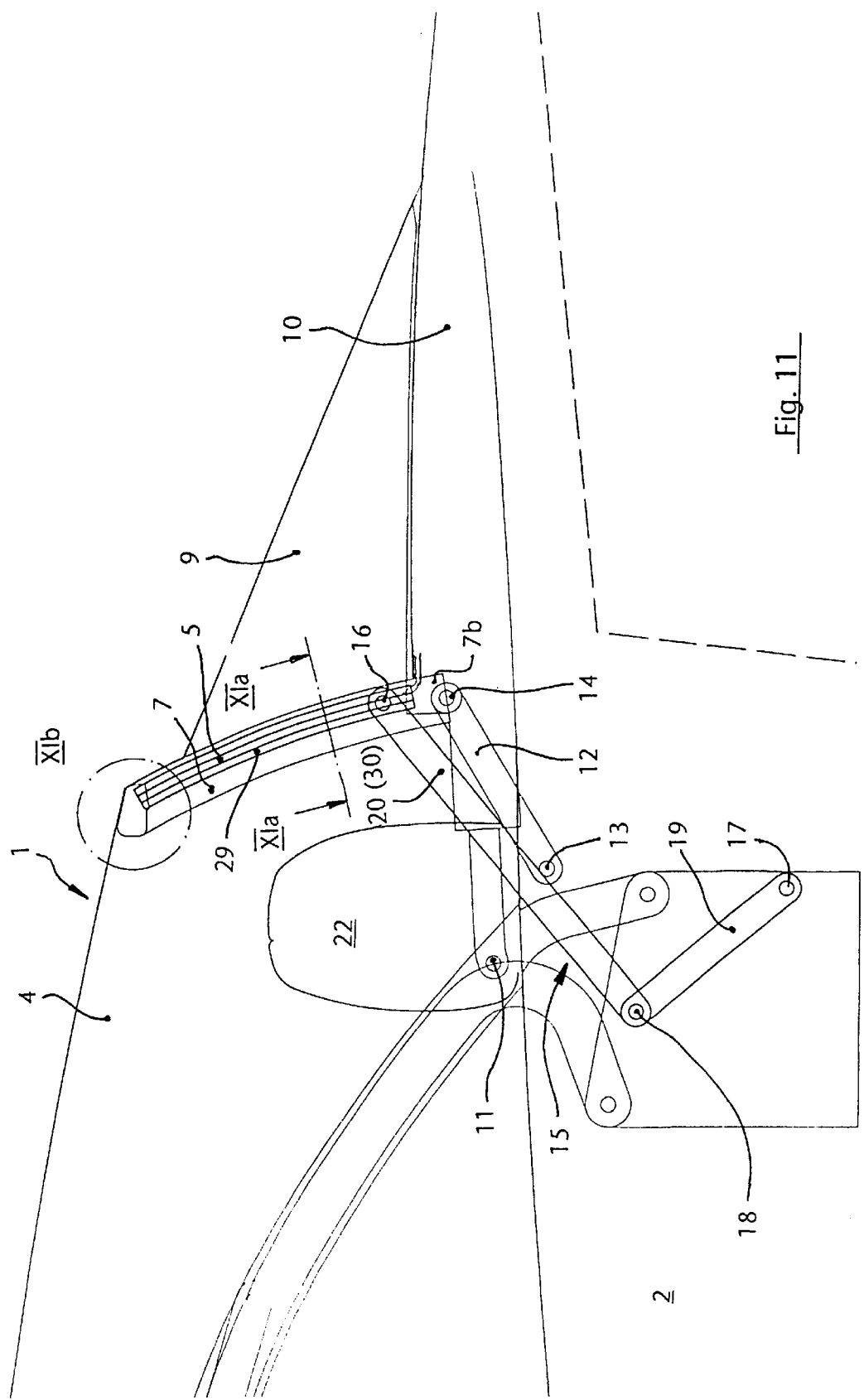
FIG. 11 shows a view, similar to that of FIG. 5, of a further embodiment with a driving lever and swiveling lever for swiveling up the rear window.
Figure 11A:
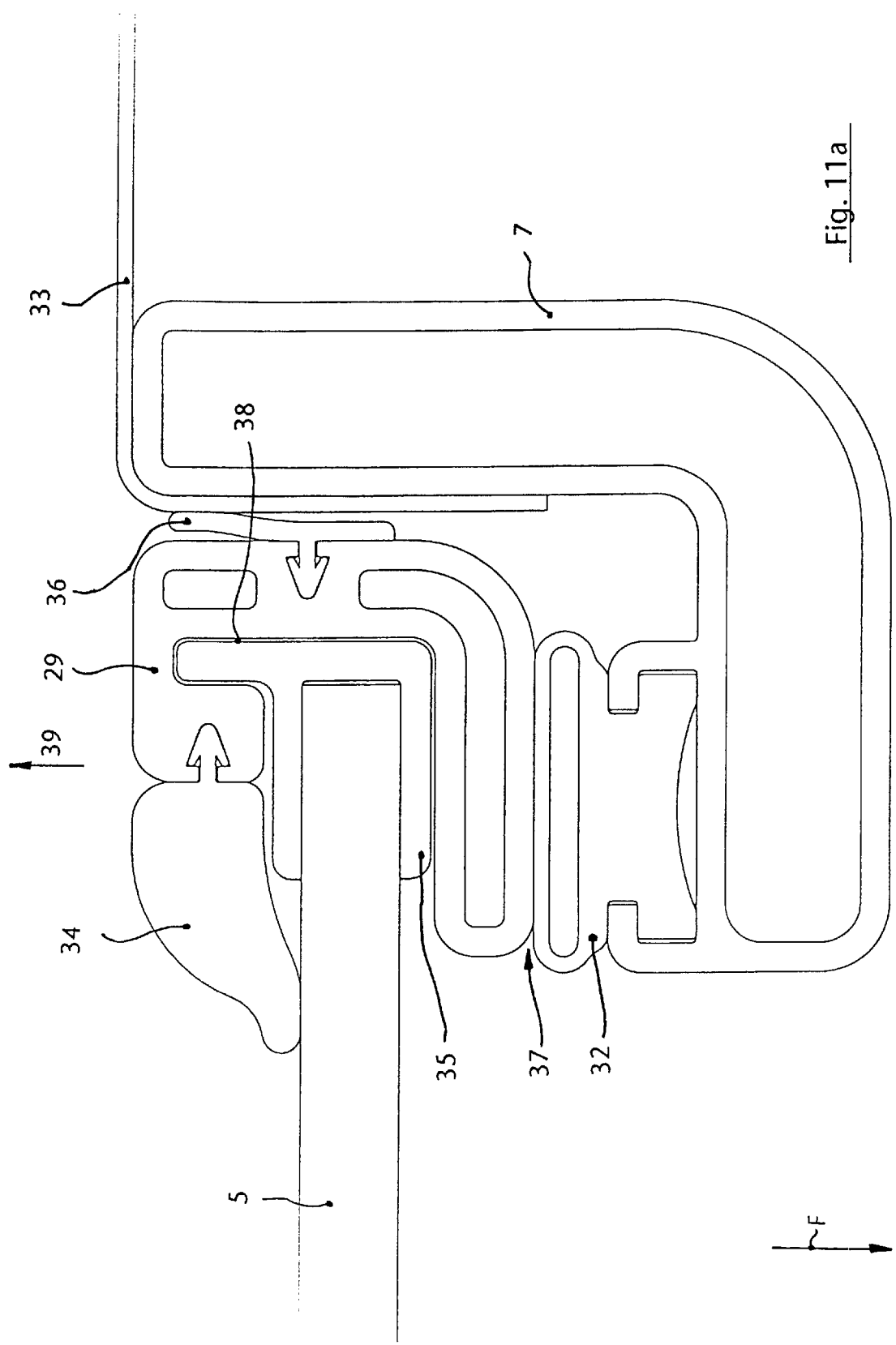
FIG. 11a shows a section along the line XIa—XIa of FIG. 11.
Figure 11B:
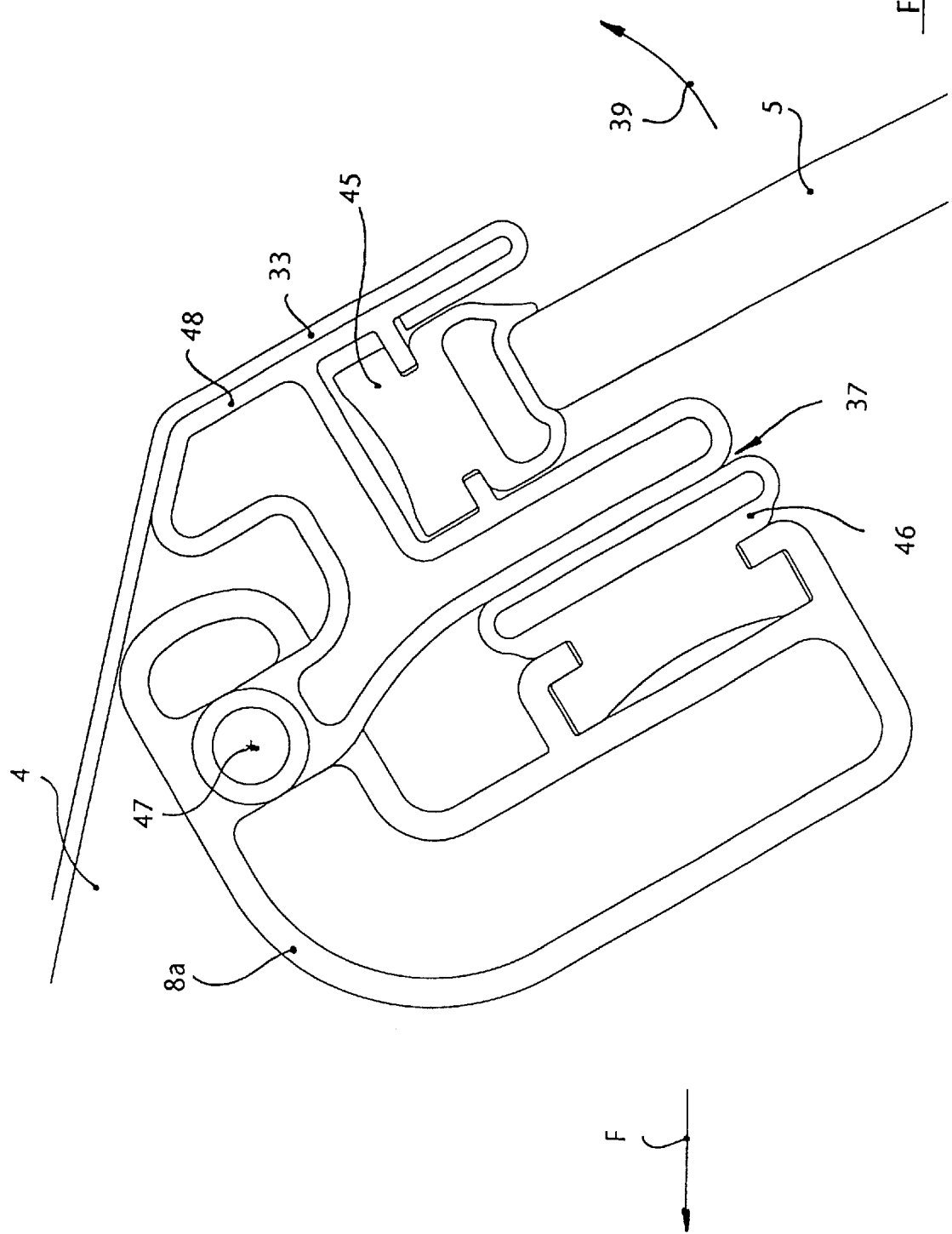
FIG. 11b shows a view of a detail of approximately the region XIb in FIG. 11, cut in the longitudinal median plane of the vehicle.
Figure 12:
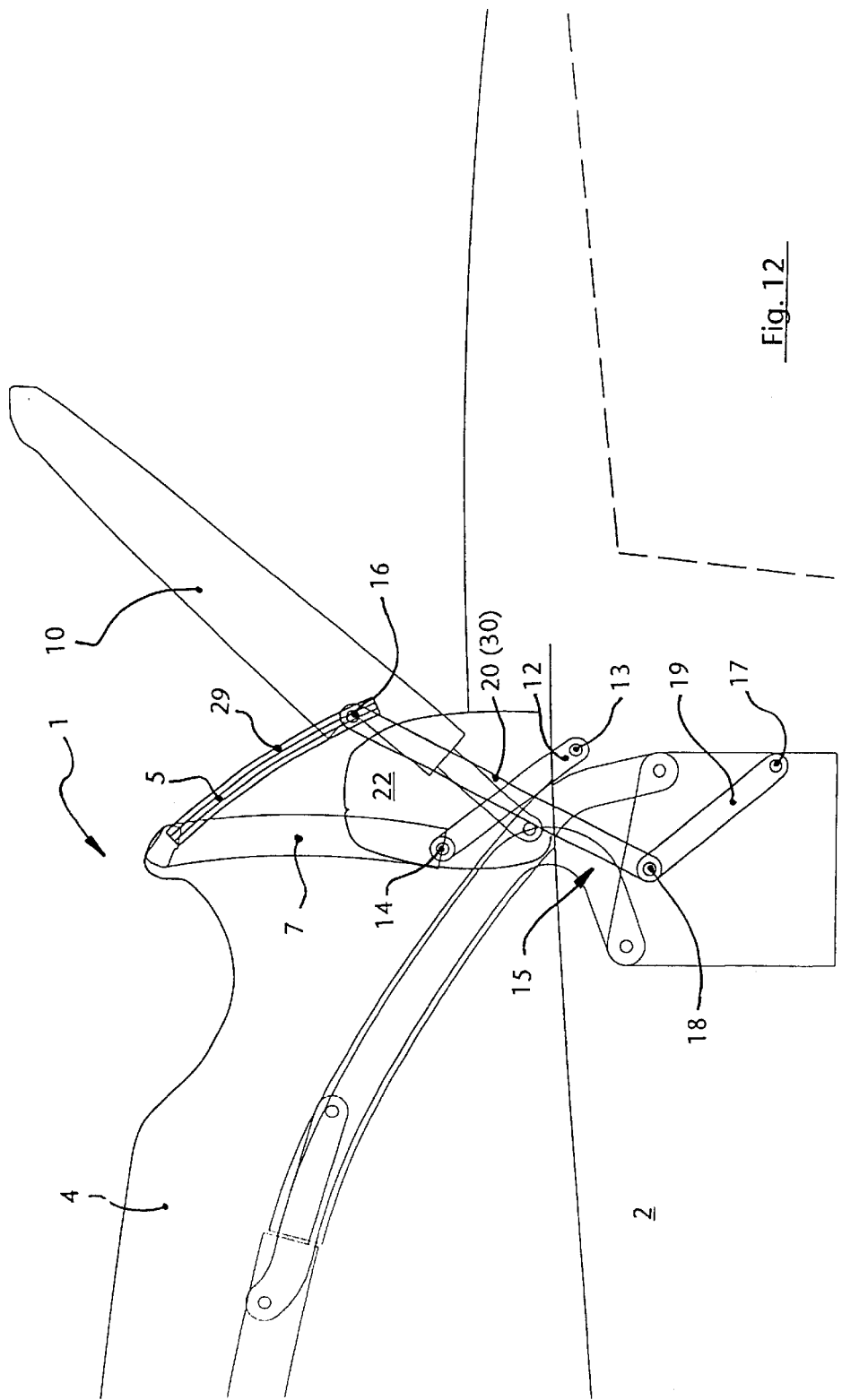
FIG. 12 shows an embodiment of FIG. 11 during the opening of the folding top.
Figure 13:
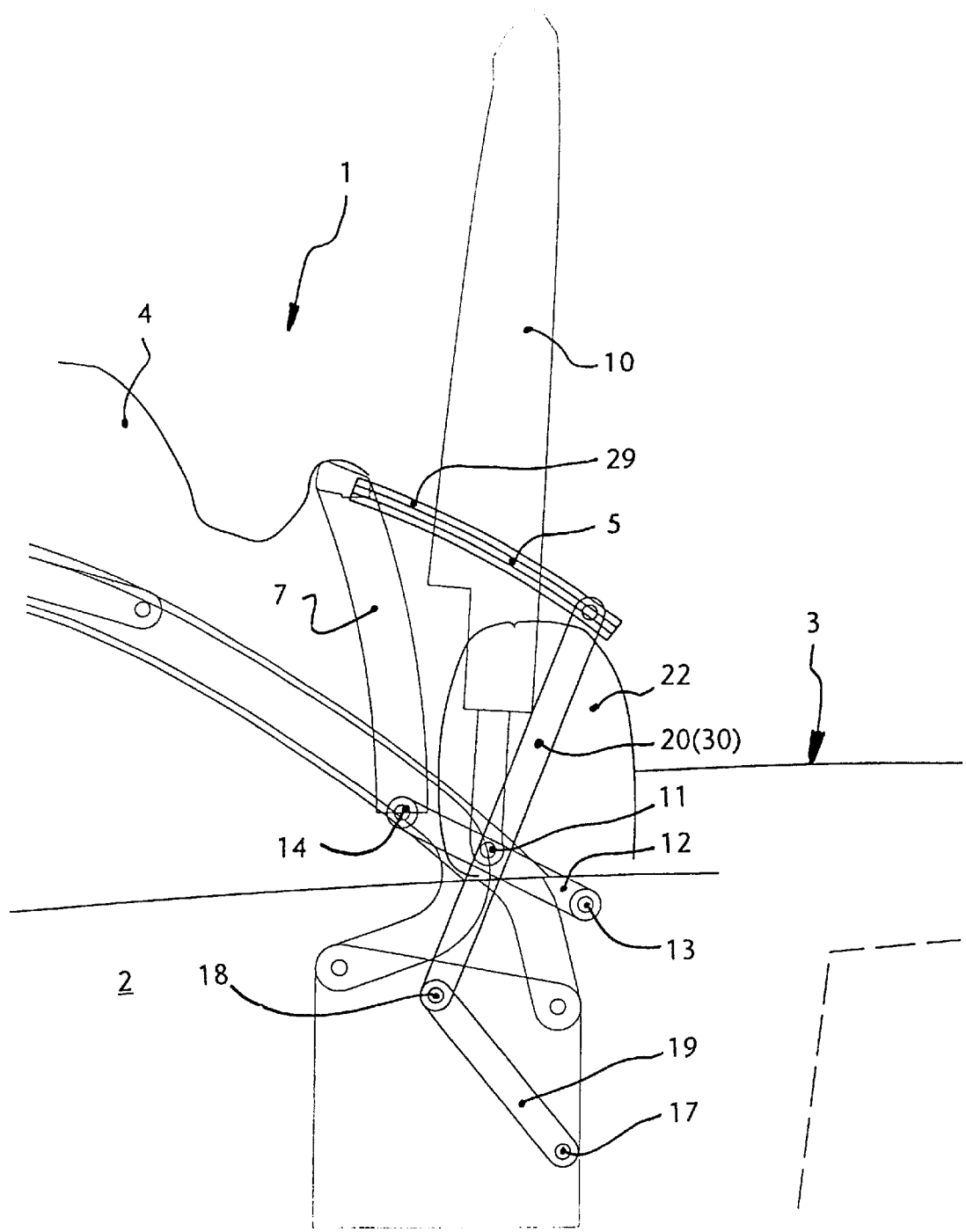
FIG. 13 shows a view, similar to that of FIG. 12, as the opening of the folding top has progressed further.
Figure 14:
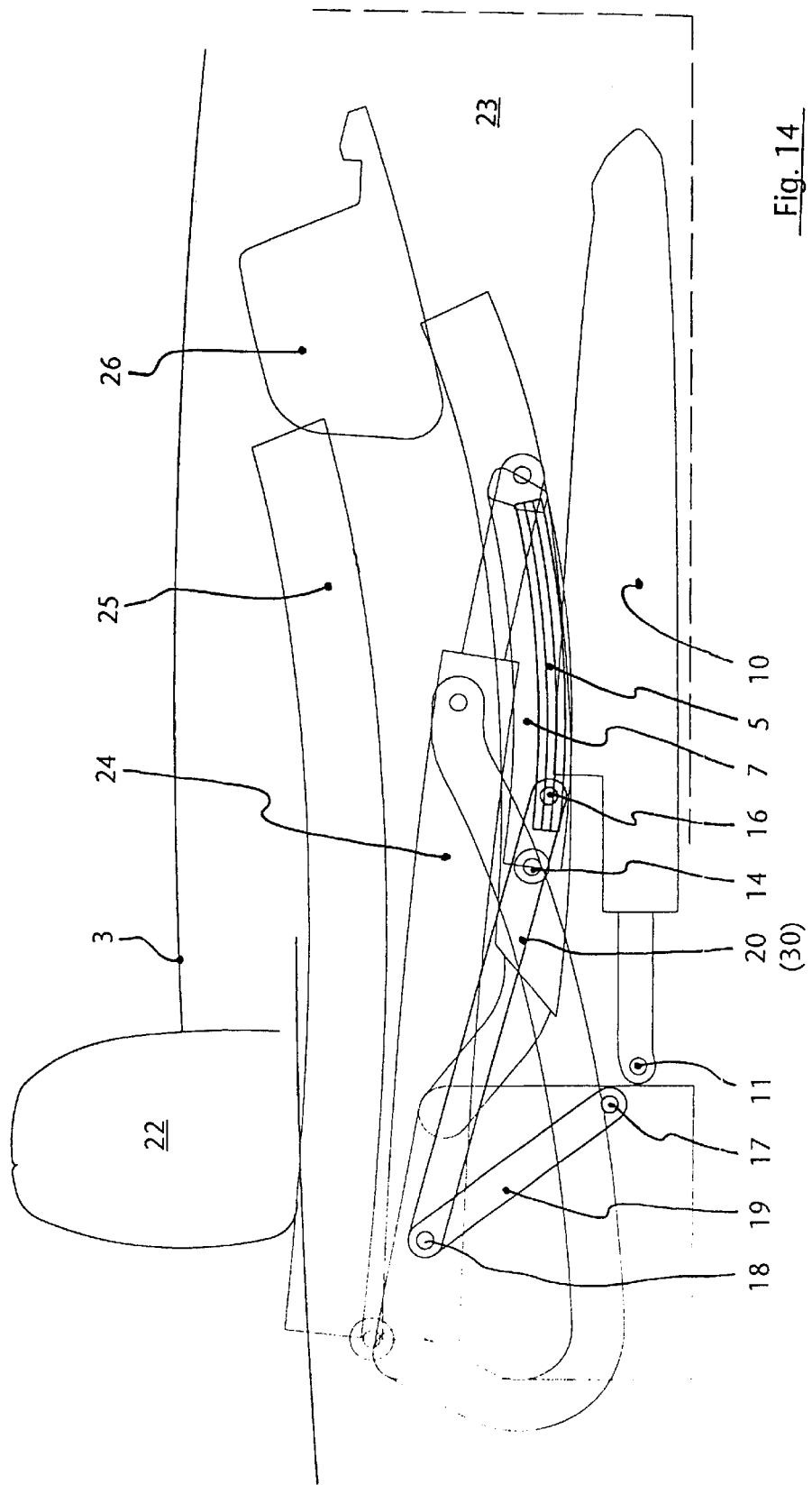
FIG. 14 shows a view, similar to that of FIG. 13, with the folding top stowed completely.

The only difference is that the swiveling lever 20, which is a component of the swiveling lever arrangement 15 and serves to swivel up the rear window 5 during the opening and closing of the roof 3, additionally represents a driving lever 30 for lowering the rear window 5 (FIGS. 15 and 16). Since the rear window 5 is held in the lower region in the region of the working axis 16 of the lever 20, a traveling telescopic guide 7a is dispensable. Instead, the rear window 5 is held in a sliding guide 29, which remains within the frame 7 during the lowering. When the rear window 5 is swiveled up (FIGS. 11 to 14), the sliding guide 29, which may be constructed U-shaped in cross section, is swiveled along. Instead of the sliding guide 29, a telescopic guide 7a can also be used in the example. However, the sliding guide 29 is easier to realize mechanically. According to the fourth example (FIG. 11a), the sliding guide 29 is held in the L-shaped frame 7 in order to ensure that the rear window 5 can be swiveled up along the parting plane 37 with respect to the frame 7. Within the sliding guide 29, a frame part 35 is held, which borders the rear window 5 laterally and can be shifted relative to the sliding guide 29. For this purpose, a sliding path 38 is used, which is constructed as a gap between the parts 29 and 35. An additional seal 36, which can also be constructed in the form of the seal 41 of FIG. 5a, is provided in order to seal the gap between the rear window 5 and the material 33 of the folding top. When the rear window 5 is swiveled up, the sliding guide 29 is swiveled along with it completely. In addition, a seal 34 is fastened with a harpoon stitch (of course, other means of fastening also come into consideration) at the sliding guide 29 and ensures that the sliding path 38 is sealed, in that the seal 34 seals the rear window 5 with respect to the sliding guide 29.

The upper coupling of the rear window 5 in the region of the transverse frame part 8a of the frame 7 corresponds essentially to that of the example shown above in FIG. 5b.

What we claim is:

1. A convertible roof apparatus for a vehicle comprising a roof structure which is movable between an up position and a stored position, a window frame on said roof structure, a window on said window frame, and an actuating mechanism for moving said window relative to said window frame between a closed position and an open position when said roof structure is in said up position.

2. A convertible roof apparatus according to claim 1 wherein said vehicle has a parapet forming an upper boundary of the vehicle, said actuating mechanism disposing said window at an elevation at least as low as the elevation of said parapet when said window is in said open position and said roof structure is in said up position.

3. A convertible roof apparatus according to claim 1 wherein said window frame comprises an inverted generally U-shaped frame, said window being held in said U-shaped frame when said window is in said closed position.

4. A convertible roof apparatus according to claim 1 wherein said window depends from said window frame when said window is in said open position.

5. A convertible roof apparatus according to claim 4 wherein said window extends into the vehicle when said window is in said open position.

6. A convertible roof apparatus according to claim 1 wherein said actuating mechanism effects movement of said window relative to said window frame between said open position which provides an opening between said window and said window frame and said closed position which closes said opening between said window and said window frame.

7. A convertible roof apparatus according to claim 1 wherein said window includes a pivot device pivotably mounting said window on said window frame.

8. A convertible roof apparatus according to claim 7 wherein said window has first and second lateral edge portions, said first lateral edge portion being at a higher elevation than said second lateral edge portion when said roof structure is in said up position, said pivot device pivotably mounting first lateral edge portion on said window frame.

9. A convertible roof apparatus according to claim 8 wherein said window frame has a lateral edge section which is disposed at a higher elevation than said second lateral edge portion of said window when said roof structure is in said up position, said pivot device pivotably mounting said first lateral edge portion of said window to said lateral edge section of said window frame.

10. A convertible roof apparatus according to claim 6 wherein said roof structure has an intermediate position between said up position and said stored position, said actuating mechanism disposing said window in said closed position when said roof structure is in said up position and disposing said window in said open position when said roof structure is in said intermediate position.

11. A convertible roof apparatus according to claim 10 wherein said second lateral edge portion of said window is at a higher elevation when said roof structure is at said intermediate position than when said roof structure is at said up position such that said second lateral edge portion elevates as said roof structure moves from said up position to said intermediate position.

12. A convertible roof apparatus according to claim 10 wherein said actuating mechanism disposes said window in said closed position when said roof structure is in said down position.

13. A convertible roof apparatus according to claim 1 wherein said roof structure comprises a cover material which extends to a rear region, said rear region having two lateral end portions, said two lateral end portions extending rearwardly of said window frame when said roof structure is in said up position.

14. A convertible roof apparatus according to claim 13 wherein said window frame extends approximately vertically between said two lateral end portions when said roof structure is in said up position.

15. A convertible roof apparatus according to claim 13 wherein each of said two lateral end portions have a generally triangular configuration.

16. A convertible roof apparatus according to claim 13 wherein said roof structure includes tension brackets connected to the vehicle body for tensioning said two lateral end portions when said roof structure is in said up position.

17. A convertible roof apparatus according to claim 1 wherein said window frame slidably mounts said window, said actuating mechanism being operable to slide said window relative to said window frame between said open and closed positions while said roof structure is in said up position.

18. A convertible roof apparatus according to claim 1 wherein said window frame has an inverted U-shaped frame having a transverse base portion and two leg portions extending from said base portion, said window and said two leg portions having guide parts for guiding the window on the two leg portions as the window telescopically slides relative to the two leg portions between said closed and open positions.

19. A convertible roof apparatus according to claim 18 wherein said actuating mechanism includes a connection connected to said guiding parts on said window such that said actuating mechanism is operable to telescopically slide said window relative to the two leg portions of the window frame between said closed and open positions.

20. A convertible roof apparatus according to claim 1 wherein said actuating mechanism includes a driving lever connected between said window and said vehicle.

21. A convertible roof apparatus according to claim 1 wherein said window has a lower end portion, said actuating mechanism including a driving element pivotably connected to said lower end portion of said window and to said vehicle.

22. A convertible roof apparatus according to claim 1 wherein said actuating mechanism moves said window about a partial circular path as said window moves between said closed and open positions.

23. A convertible roof apparatus according to claim 1 wherein said actuating mechanism includes a driving lever pivotably connected to said window and to said vehicle.

24. A convertible roof apparatus for a vehicle having a parapet, a roof structure which is movable between an up position and a stored position, a window frame on said roof structure, a window on said window frame, an actuating mechanism for moving said window relative to said window frame between an open and a closed position, said actuating mechanism disposing said window at an elevation at least as low as the elevation of said parapet when said window is in said open position and said roof structure is in said up position.

25. A convertible roof apparatus for a vehicle having a parapet forming an upper boundary of the vehicle, a roof structure which is movable between an up position and a stored position, a window on said roof structure, an actuating mechanism for moving said window relative to said roof structure between an open and a closed position when said roof structure is in said up position, said window having an upper lateral edge and a lower lateral edge, said upper lateral edge being at a higher elevation than said lower lateral edge when said window is in said closed position and said roof structure is in said up position, said actuating mechanism disposing said upper lateral edge of said window at an elevation at least as low as the elevation of the upper boundary of said window parapet when said window is in said open position and said roof structure is in said up position.

26. A convertible roof apparatus according to claim 25 wherein said actuating mechanism disposes said window in a closed position when said roof structure is in said stored position.

* * * * *